(12) United States Patent
Notoya et al.

(10) Patent No.: US 7,436,859 B2
(45) Date of Patent: Oct. 14, 2008

(54) DEMULTIPLEXING DEVICE

(75) Inventors: Youji Notoya, Neyagawa (JP);
Yoshinori Matsui, Ikoma (JP);
Tadamasa Toma, Toyonaka (JP); Koji Imura, Machida (JP); Naoto Otake, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 818 days.

(21) Appl. No.: 10/504,295

(22) PCT Filed: Apr. 22, 2003

(86) PCT No.: PCT/JP03/05075

§ 371 (c)(1),
(2), (4) Date: Aug. 12, 2004

(87) PCT Pub. No.: WO03/092285

PCT Pub. Date: Nov. 6, 2003

(65) Prior Publication Data

US 2005/0155071 A1    Jul. 14, 2005

(30) Foreign Application Priority Data

Apr. 26, 2002  (JP) .............................. 2002-126028

(51) Int. Cl.
*H04J 3/04* (2006.01)
(52) U.S. Cl. ..................................... 370/535
(58) Field of Classification Search ......... 370/535–537; 386/96
See application file for complete search history.

(56) References Cited

U.S. PATENT DOCUMENTS

| 6,515,944 B1 * | 2/2003 | Yoshida et al. ........... 369/30.23 |
| 7,006,758 B1 | 2/2006 | Yamamoto et al. |
| 2006/0133777 A1 * | 6/2006 | Yamamoto et al ............. 386/96 |

FOREIGN PATENT DOCUMENTS

| CN | 1232253 | 10/1999 |
| JP | 11-296984 | 10/1999 |
| JP | 3-60919 | 4/2000 |
| JP | 2000-353134 | 12/2000 |
| JP | 2002-027381 | 1/2002 |

OTHER PUBLICATIONS

"International Organisation for Standardisation Organisation Internationale De Normalisation ISO/IEC JTC1/SC29/WG11 Coding of Moving Pictures and Audio", Jul. 20, 2001, MPEG01/N4270-1, pp. 1-51.

* cited by examiner

*Primary Examiner*—Kwang B. Yao
*Assistant Examiner*—Tung Q Tran
(74) *Attorney, Agent, or Firm*—Wenderoth, Lind & Ponack, L.L.P.

(57) ABSTRACT

A demultiplexing apparatus includes a data obtainment unit to obtain the MP4 file data, and a decoding unit to demultiplex the MP4 file data obtained by the data obtainment unit into pairs of a moov and a mdat and pairs of a moof and a mdat, and decode those pairs pair-by-pair. A content duration specification unit specifies the content total duration based on the content total duration information contained in the moov of the MP4 file data obtained by the data obtainment unit and a playback unit displays the content total duration specified by the content duration specification unit.

4 Claims, 31 Drawing Sheets

Fig. 21

1.1     Track Extends Box 1.1.1   Syntax
aligned(8) class TrackExtendsBox extends FullBox('trex',0,0){
        unsigned int(32)    track_ID;
        if(version==1){
            unsigned int(64)    track_duration;
        }else{//version==0
            unsigned int(32)    track_duration;
        }
        unsigned int(32)    default_sample_description_index;
        unsigned int(32)    default_sample_duration;
        unsigned int(32)    default_sample_size;
        unsigned int(32)    default_sample_flags
} track_duration is introduced. This field is an integer that indicates the duration of this track in movie fragments(in the timescale indicated in the Movie Header Box). If this field is set to 0, track_duration is not set in this box.

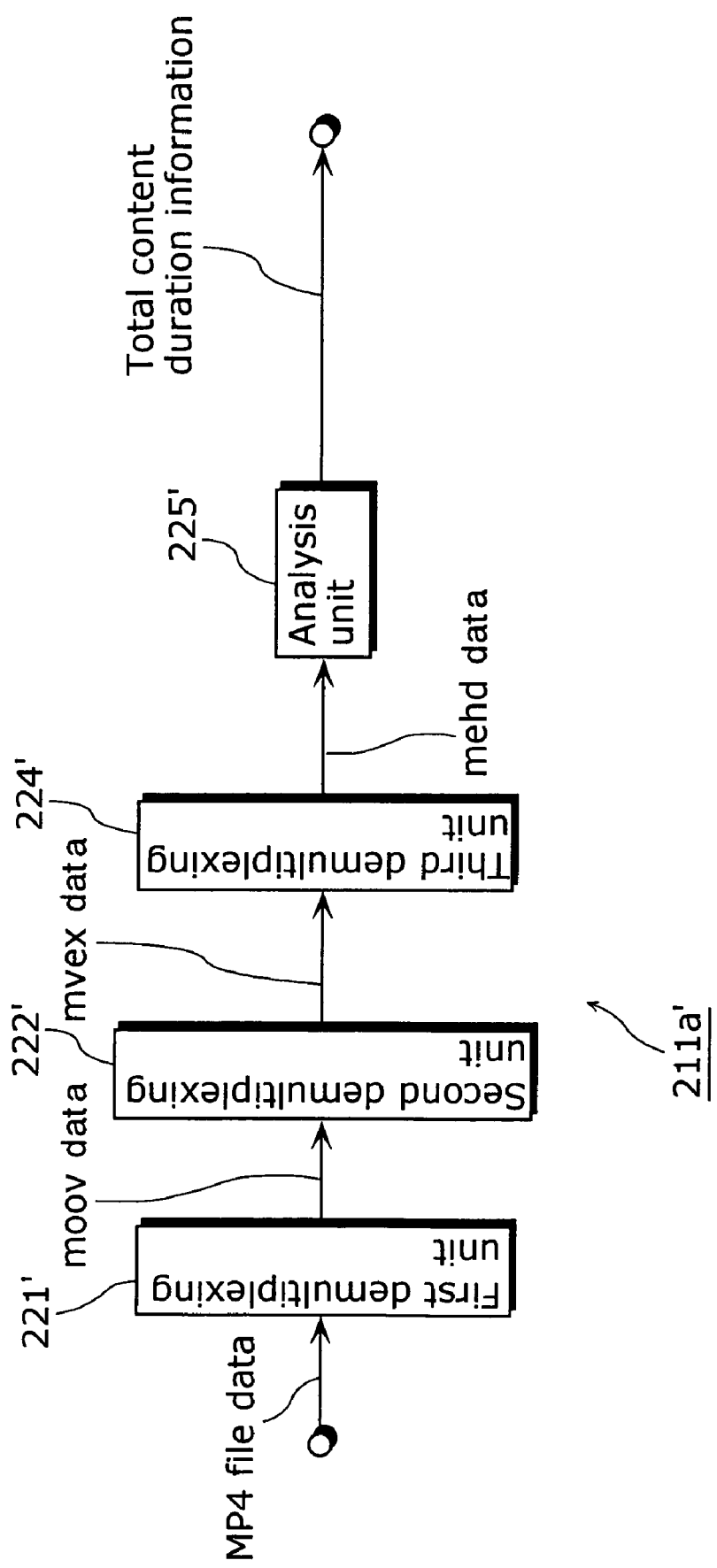

Fig. 24

1.1     Movie Extends Header Box
Box Type:    'mehd'
Container:   Movie Extends Box('mvex')
Mandatory:   No
Quantity:Zero or one The Movie Extends Header is optional, and provides the overall duration, including fragments, of a fragmented movie. If this box is not present, the overall duration must be computed by examining each fragment.

1.1.1   Syntax
```
aligned(8) class MovieExtendsHeaderBox extends FullBox('mehd', version, 0){
    if (version==1){
        unsigned int(64)fragment_duration;
    } else{//version==0
        unsigned int(32)fragment_duration;
    }
}
```
1.1.2   Semantics fragment_duration is an integer that declares length of the presentation of the whole movie including fragments(in the timescale indicated in the Movie Header Box). The value of this field corresponds to the duration of the longest track, including movie fragments. If an MP4 file is created in real-time, such as used in live streaming, it is not likely that the fragment_duration is known in advance and this box may be omitted.

Fig. 31

1.1 Track Fragment Header Box 1.1.1 Syntax
aligned(8) class TrackFragmentHeaderBox
                  extends FullBox('tfhd',0,tf_flags){
    unsigned int(32)    track_ID;
    // all the following are optional fields
    unsigned int(32)    traf_duration;
    unsigned int(64)    base_data_offset;
    unsigned int(32)    sample_description_index;
    unsigned int(32)    default_sample_duration;
    unsigned int(32)    default_sample_size;
    unsigned int(32)    default_sample_flags
}
traf_duration is introduced as an optional field. This field is an integer that indicates the sum of the sample durations in Track Fragment Box(in the timescale indicated in the Media Header Box).

US 7,436,859 B2

DEMULTIPLEXING DEVICE

TECHNICAL FIELD

The present invention relates to a demultiplexing apparatus for demultiplexing multiplexed data where multi media data such as video data and audio data are multiplexed, and a multiplexing apparatus for multiplexing multi media data.

BACKGROUND ART

An MP4 has been focused on as a file format for multiplexing and storing multi media data (that is a content of video, audio, text, still picture or the like) in these days.

The applicable range of the MP4 is expanding, for example, it is employed as a file format of MPEG-4 that is a video compression coding method or JPEG 2000 that is a next generation version of JPEG that is a natural picture compression coding method.

This MP4 file format was initially composed of a data box where multiplexed content is stored and a header box where information on the content of the data part is stored.

Therefore, a multiplexing apparatus for generating MP4 file data from multi media data obtains multi media data, performs coding and multiplexing, and makes a header box to complete the MP4 file data after finishing processing on all the multi media data.

This multiplexing apparatus needs a lot of time to make the header box after finishing obtaining and processing multi media data when the information amount of the multi media data is a lot.

For example, in the case of a multiplexing apparatus being used as a cellular phone with a video function, a time lag occurs at the time of receiving a call while videotaping because of making a header box where information on all the videotaped contents are contained. Also, there was a problem because the making process of a header box is cancelled in the midstream and the MP4 file data cannot be completed when giving a priority to receiving a call.

Therefore, the MP4 file format is improved in a way that plural pairs of a data box and a header box are connected to each other.

FIG. 1 is a data block diagram showing a basic file format of the conventional MP4 file data that is improved as mentioned above.

This MP4 file data 900 is composed of a non-fragment data part 900a and a fragmented data part 900b.

Non-fragment data part 900a comprises a movie box 910 as the above-mentioned header box (called "moov" from here) and a media data box 920 as the above-mentioned data box (called "mdat" from here).

The moov 910 is further composed of a movie header box 911 (called "mvhd" from here), a plurality of track box 912 (called "trak" from here), and a movie extend box 913 (called "mvex" from here).

The fragmented data part 900b is made so that plural pairs of a movie fragment box 930 as the above-mentioned header box (called "moof" from here) and a media data box 940 as the above-mentioned data box (called "mdat" from here) are connected to each other.

The moof 930 is further composed of a movie fragment header box 931 (called "mfhd" from here) and a plurality of track fragment box 932 (called "traf" from here).

FIG. 2 is a data block diagram showing the detailed structure of the moov 910.

The mvhd 911 contains a movie duration field 911a for storing non-fragment content duration information indicating the duration needed for playback of the content contained in the non-fragment data part 900a (the non-fragment content duration).

The trak 912 further contains a track header box 914 (called "tkhd" from here), and the tkhd 914 contains a track ID field 916 for storing track identification information for identifying a track and a track duration field 917. Also, this track duration field 917 stores non-fragment track duration information for indicating the duration needed for playback of a track contained in the non-fragment data part 900a (the non-fragment track duration) indicated by the track identification information.

A track used here is a kind of contents and means video, audio, text or the like.

The mvex 913 contains track extend box 915 (called "trex" from here) in proportion to the number of tracks contained in the fragmented data part 900b.

This trex 915 contains a track ID field 918 for storing track identification information for identifying a track and the first default duration field 919 for storing a default sample duration information indicating the duration preset as a default to the track sample of the fragmented data part 900b specified by the track identification information.

A sample used here is a minimum unit of an MP4 file format. A sample means a frame or a picture when the track is video, while a sample means audio information, for example, of 20 msec when the track is audio.

FIG. 3 is a data block diagram showing the detailed structure of a moof 930.

A traf 932 contained in the moof 930 further contains a track fragment header box 933 (called "tfhd" from here) and a plurality of track fragment run box 936 (called "trun" from here).

This tfhd 933 contains a track ID field 934 for storing track identification information for identifying a track and the second default duration field 935 for storing default sample duration information indicating the preset duration as a default to the sample associated with traf 932 stored in tfhd 933 out of the track sample of the fragmented data part 900b specified by the track identification information. The second default duration field 935 can be omitted here, and the first default duration field 919 is referred to in this case.

Also, trun 936 contains a sample duration field 937 for storing sample duration information indicating the durations of respective samples (sample durations) contained in the tracks of the fragmented data part 900b specified by the above-mentioned track identification information.

In this way, the conventional multiplexing apparatus completes an MP4 file data 900 every time it obtains and processes multi media data and makes use of the effect in a real time recording by making MP4 file format contain a pair of a mdat 920 and a moov 910, and plural pairs of a mdat 940 and a moof 930, in other words, by making a plural pairs of a box storing a multiplexed content and a box storing information concerning the content included in the earlier mentioned box are connected to each other. And, the conventional multiplexing apparatus made as a cellular phone with a videotaping function can avoid the occurrence of a time lag at the time of receiving a call while videotaping.

FIG. 4 is a block diagram showing the structure of the conventional multiplexing apparatus for generating the above-mentioned MP4 file data 900.

This multiplexing apparatus 700 comprises a video data analysis unit 701, an audio data analysis unit 702, the first selector switch 703, the second selector switch 704, a control unit 708, a moof generation unit 705, a moov generation unit 706, and a file generation unit 707.

The video data analysis unit 701 generates video specification information indicating the time stamp or the size of the video data by obtaining and analyzing the video data. After that, the video data analysis unit 701 codes the video data, makes video coded data, and outputs the video coded data and the video specification information.

The audio data analysis unit 702 generates audio specification information indicating the time stamp or the size of the audio data by obtaining and analyzing the audio data. After that, the audio data analysis unit 702 codes the audio data, makes the audio coded data, and outputs the audio coded data and the audio specification information.

The moov generation unit 706 generates and outputs the data (moov data) stored in a moov 910 according to the control from the control unit 708.

The moof output unit 705 generates and outputs the data (moof data) stored in a moof 930 according to the control from the control unit 708.

The control unit 708 obtains the video specification information from the video data analysis unit 701 and the audio specification information from the audio data analysis unit 702, and outputs the data to be stored in the non-fragment data part 900a that contains the moov data from the second selector switch 704 first and the data to be stored in the fragmented data part 900b that contains the moof data next by switching the first selector switch 703 and the second selector switch 704 based on the video specification information and audio specification information.

The file generation unit 707 performs multiplexing processing on the respective data outputted from the second selector switch 704, and generates and outputs an MP4 file data 900.

FIG. 5 is a flow chart showing the operation concerning the generation of the moov data and the moof data of the conventional multiplexing apparatus 700.

First, the multiplexing apparatus 700 generates moov data (step S100)

Next, the multiplexing apparatus 700 generates moof data (step S102).

After that, the multiplexing apparatus 700 judges whether or not there remains unprocessed data in the inputted video data and audio data to be coded and multiplexed (step S104). When the multiplexing apparatus 700 judges that there remains unprocessed data (step S104: Yes), it repeatedly exerts the operation from the step S102 while it finishes the processing when it judges that there remains no unprocessed data (step S104: No).

In this way, the conventional multiplexing apparatus 700 using the MP4 file data 900 is effective for a real time recording because it makes moof data in order.

By the way, the above-mentioned MP4 file data 900 is suitable for a streaming because it is made in a way that plural pairs of a data box and a header box are connected to each other as shown in FIG. 1~FIG. 3. In other words, the demultiplexing apparatus for playing back a content can play it back (perform download playback) in order before finishing downloading all the MP4 file data 900 distributed as a stream by obtaining the MP4 file data 900 and performing demultiplexing.

FIG. 6 is a block diagram showing the structure of the conventional demultiplexing apparatus for playing back a content based on the above-mentioned MP4 file data 900.

This demultiplexing apparatus 800 obtains and plays back the MP4 file data 900, and comprises a data obtainment unit 810 operable to obtain the MP4 file data 900, a decoding unit 813 operable to demultiplex and decode the MP4 file data 900 obtained in the data obtainment unit 810, a time processing unit 811 operable to perform time processing based on the obtained MP4 file data 900, a random access processing unit 812 operable to perform a random access processing on the obtained MP4 file data 900, a playback unit 814 operable to output video and audio based on the data outputted from the decoding unit 813.

Also, the time processing unit 811 has a duration specification unit 811a operable to specify the duration needed for playback of part of the content contained in the MP4 file data 900 and a playback time specification unit 811b operable to specify playback time. Playback time used here means the time needed for playback from the starting time to the present time when performing playback from the head of the content.

FIG. 7 is a block diagram showing the internal structure of the duration specification unit 811a.

The duration specification unit 811a has the first demultiplexing unit 821, the second demultiplexing unit 822, the third demultiplexing unit 823, the first analysis unit 824, and the second analysis unit 825.

The first demultiplexing unit 821 demultiplexes the moov data from the MP4 file data 900 and outputs it upon obtaining the MP4 file data 900.

The second demultiplexing unit 822 demultiplexes the data stored in mvhd911 (mvhd data) and the data stored in trak912 (trak data) from the moov data and output them upon obtaining the moov data.

The third demultiplexing unit 823 demultiplexes the data stored in tkhd914 (tkhd data) from the trak data and outputs it upon obtaining the trak data.

The first analysis unit 824 analyses the mvhd data and outputs the non-fragment content duration information stored in the movie duration field 911a upon obtaining mvhd data from the second demultiplexing unit 822.

The second analysis unit 825 analyses the tkhd data and outputs the track identification information stored in the track ID field 916 upon obtaining the tkhd data from the third demultiplexing unit 823, and it also outputs the non-fragment track duration information stored in the track duration field 917 according to the track identification information.

The duration specification unit 811a like this outputs the non-fragment content duration information to the playback unit 814, and it also outputs, to the playback unit 814, the track identification information and the non-fragment track duration information corresponding to the track of the non-fragment data part 900a indicated by the track identification information.

After that, the playback unit 814 may display the non-fragment content durations or the non-fragment track durations for respective tracks as the need arises when obtaining the non-fragment content duration information, the track duration information and the track identification information. Also, the playback unit 814 displays the playback time performing playback of the video or the audio based on the specification result by the playback time specification unit 811b.

FIG. 8 is a block diagram showing the structure of the random access processing unit 812.

The random access processing unit 812 searches a sample corresponding to a target time as a target sample from the saved MP4 file data 900 upon obtaining the target duration information indicating the target time from outside, and comprises a data storage unit 830a, the first demultiplexing unit 830, the second demultiplexing unit 831, the third demultiplexing unit 832, the fourth demultiplexing unit 835, the fifth demultiplexing unit 834, the first analysis unit 836, the second analysis unit 837, the third analysis unit 838, a track control unit 833, a determination unit 839 and a control unit 840. The target time used here means playback starting time when a user tries to perform playback from the middle of the content. For example, when a user tries to perform playback of the ten-minute content in total duration without viewing 2 minutes from the start, the target time is 2 minutes. The data storage unit 830a stores the MP4 file data 900 stored in the data obtainment unit 810.

The first demultiplexing unit 830 demultiplexes the moov data and the moof data from the MP4 file data 900 and output them upon obtaining the MP4 file data 900 from the data storage unit 830a.

The third demultiplexing unit 832 demultiplexes data (mvex data) stored in the mvex 913 from the moov data and outputs the mvex data upon obtaining the moov data.

The track control unit 833 outputs the track identification information based on the moov data upon obtaining the moov data from the first demultiplexing unit 830.

The second demultiplexing unit 831 demultiplexes the data (traf data) stored in traf 932 corresponding to the track specified by the track identification information from the moof data and outputs the traf data upon obtaining the track identification information from the track control unit 833.

The fourth demultiplexing unit 835 demultiplexes the data (tfhd data) stored in the tfhd 933 and the data (trun data) stored in the trun 936 from the traf data and outputs them upon obtaining the traf data from the second demultiplexing unit 831.

The fifth demultiplexing unit 834 demultiplexes the data (trex data) stored in the trex 915 corresponding to the track specified by the track identification information from the mvex data and outputs the trex data upon obtaining the mvex data from the third demultiplexing unit 832 and track identification information from the track control unit 833.

The first analysis unit 836 analyses the trex data and outputs the default sample duration information contained in the trex data as the first duration information upon obtaining the trex data from the fifth demultiplexing unit 834.

The second analysis unit 837 analyzes the tfhd data and outputs the sample duration information contained in the tfhd data as the second duration information upon obtaining the tfhd data from the fourth demultiplexing unit 835.

The third analysis unit 838 analyses the trun data and outputs the sample duration information contained in the trun data as the third duration information upon obtaining the trun data from the fourth demultiplexing unit 835.

The determination unit 839 selects a piece of information out of the first duration information obtained from the first analysis unit 836, the second duration information obtained from the second analysis unit 837 and the third duration information obtained from the third analysis unit 838 and then outputs the determined information as the duration information. First, the determination unit 839 gives the first priority to the third duration information, gives higher priority to the second duration information when the third duration information cannot be obtained because of its omission, selects the first duration information when the second duration information cannot be obtained because of its omission, and outputs the selected information.

Also, the determination unit 839 outputs the sample identification information for identifying the sample corresponding to the duration information when outputting the duration information.

The control unit 840 adds durations indicated in the duration information outputted from the determination unit 839 in order upon obtaining the target duration information showing the target time. After that, the control unit 840 performs the above-mentioned addition until the addition result reaches to the target time indicated in the target duration information, and outputs the sample identification information obtained from the determination unit 839 as the target sample identification information when reaching to the target time.

FIG. 9 is a block diagram showing the internal structure of the track control unit 833.

The track control unit 833 comprises the sixth demultiplexing unit 841 operable to obtain the moov data and demultiplex trak data from the moov data, the seventh demultiplexing unit 842 further operable to obtain the trak data and demultiplex tkhd data from the trak data, and an analysis unit 843 operable to specify and output the track identification information by analyzing the tkhd data.

FIG. 10 is an illustration explaining the outline operation of the random access processing unit 812.

As shown in this FIG. 10, the conventional random access processing unit 812 specifies the target sample corresponding to the target time by adding the sample durations in order.

And, the random access processing unit 812 outputs the MP4 file data 900 and the target sample identification information to the decoding unit 813, and has the decoding unit 813 and the playback unit 814 exert the playback of the content from the target sample indicated by the target sample identification information.

The conventional demultiplexing apparatus 800 like this, when obtaining the MP4 file data 900 distributed as a stream, can perform download playback based on this and perform random access to all the stored MP4 file data 900 by having the random access processing unit 812.

However, the above-mentioned conventional demultiplexing apparatus 800 has the problem that it cannot display the total duration of all the contents including contents in the fragmented data part 900b while it can display the durations needed for playback of the contents included in the non-fragment data part when performing download playback of the MP4 file data 900, and thus it is not user-friendly.

FIG. 11 is an illustration explaining the problem in the conventional demultiplexing apparatus 800.

The demultiplexing apparatus 800 made as a cellular phone downloads the MP4 file data 900 distributed as a stream via a base station 990, and plays back the downloaded MP4 file data 900 in order. At that time, the demultiplexing apparatus 800 displays the playback time, but it cannot specify the duration needed for the playback of all the contents until it obtains all the MP4 file data 900. As a result, it cannot display the total duration of the content during its download or playback. For example, a user of the demultiplexing apparatus 800 may have the fear that the user cannot guess the fee in the rate system where fees are charged according to the time spent using the demultiplexing apparatus 800, or a user may have the fear that the power is cut in the middle of the download or the playback when a remaining battery capacity is near exhaustion. In this way, the conventional demultiplexing apparatus 800 cannot let the user know the total duration of the contents, and thus it lacks userfriendliness.

Therefore, the present invention is invented considering the above-mentioned problems, and its purpose is to provide the demultiplexing apparatus and the multiplexing apparatus with an improved userfriendliness at the time of download playback of the content keeping the effectiveness of the download playback and the real time recording.

SUMMARY OF INVENTION

In order to achieve the above-mentioned purpose, the demultiplexing apparatus concerning the present invention obtains multiplexed data of a digital copyrighted work starting from a header of the multiplexed data and demultiplexes the multiplexed data, wherein the multiplexed data is made in a way that plural pairs of a content storage box for storing a part of the multiplexed content and a related information storage box for storing related information on the part of the multiplexed content are connected to each other, and that total duration information for specifying a total duration needed for playback of all the contents are contained in the header of the multiplexed data, the demultiplexing apparatus comprises: a data obtainment unit operable to obtain the multiplexed data; a demultiplexing processing unit operable to demultiplex the multiplexed data obtained by the data obtainment unit into respective pairs; a total duration specification unit operable to specify the total duration based on the total duration information included in the header of the multiplexed data obtained by the data obtainment unit; and a display unit operable to display the total duration specified by the total duration specification unit. The multiplexed data is composed of the first and the second parts having the pairs respectively. The total duration information is composed of the first duration information indicating the duration needed to play back the contents contained in the first part and the second duration information indicating the duration needed to play back the contents contained in the second part. The total duration specification unit may have the feature that it specifies the total duration by adding the duration indicated by the first duration information to the duration indicated by the second duration information.

This enables the processing unit to demultiplex each pair of multiplexed data, which makes it possible to perform download playback of the contents from the multiplexed data distributed as a stream, let the user know the total duration even during the download playback because the total duration is specified in the total duration specification unit and the total duration is displayed by the display unit based on the total duration information contained in the header of the multiplexed data, and improve the userfriendliness at the time of download playback of the contents.

Also, the multiplexed data includes a first part, or a first part and a second part having the pairs respectively according to the contents contained in the multiplexed data, the total duration information indicates a duration needed for playback of a content contained in the first part when the multiplexed data includes the first part, the total duration information includes first duration information indicating a duration needed for playback of the content contained in the first part and either of duration information needed for playback of the contents contained in the second part or second duration information indicating that the durations are unknown when the multiplexed data includes the first part and the second part, the total duration specification unit judges whether the multiplexed data obtained by the data obtainment unit includes the first part, or the first part and the second part, the total duration specification unit specifies the duration indicated in the total duration information as the total duration when judging that the multiplexed data includes the first part, the total duration specification unit further judges whether or not the durations needed for playback of the contents contained in the second part is unknown based on the second duration information when judging that the multiplexed data includes the first part and the second part, the total duration specification unit specifies the total duration by adding the duration indicated by the first duration information to the duration indicated by the second duration information when judging that the duration is known, the total duration specification unit judges that it is impossible to specify the total duration when judging that the duration is unknown, and the display unit informs a user that the total duration is unknown when the total duration specification unit judges that it is impossible to specify the total duration.

By doing this, the duration needed to play back the contents contained in the first part is determined as the total duration when the multiplexed data do not have the second part, on the other hand, when the multiplexed data is composed of the first and the second parts, the total duration can be correctly determined because the durations needed to play back the contents contained in the first part and the second part are added and the addition result is specified as the total duration, plus whether or not the duration needed to play back the contents contained in the second part is unknown based on the second duration information contained in the demultiplexed data and thus it can notify the user of only reliable total duration because it notifies the user of "unknown" when the duration is unknown.

Also, the demultiplexing apparatus further comprising a playback unit operable to play back the contents demultiplexed by the demultiplexing processing unit and a playback time specification unit operable to specify playback time of the contents being played back by the playback unit, and wherein the display unit calculates a ratio of the playback time, which is specified by the playback time specification unit, with respect to the total duration specified by the total duration specification unit, and moves a predetermined graphics according to the ratio and displays the graphics.

By doing this, as the above-mentioned diagram moves according to the ratio of the playback time to the total duration, the user can easily grasp the playback condition of the contents.

Note that the present invention can also be realized as a data structure of the multiplexed data handled by the demultiplexing apparatus, a storage medium for storing the multiplexed data, a multiplexing apparatus for generating the multiplexed data, a demultiplexing method performed by the demultiplexing apparatus or a multiplexing method performed by the multiplexing apparatus, and a program for having the computer exert these methods.

Further Information about Technical Background to this Application filed, is incorporated herein by reference.

Japanese Patent application No. 2002-126028 filed Apr. 26, 2002.

U.S. Patent application No. 60/378,644 filed May 9, 2002.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 21 is a display diagram showing the syntax of the trex in accordance with an embodiment of the invention.

FIG. 22 is a block diagram showing the internal structure of the content duration specification unit operable to handle the MP4 file data that contains the mehd in accordance with an embodiment of the invention.

FIG. 24 is a display diagram showing the syntax of the mehd in accordance with an embodiment of the invention.

FIG. 31 is a display diagram showing the syntax of the tfhd concerning the variation in accordance with an embodiment of the invention.

DETAILED DESCRIPTION OF THE INVENTION

The demultiplexing apparatus and the multiplexing apparatus in the embodiment of the present invention will be explained below with reference to figures.

Figure 12:
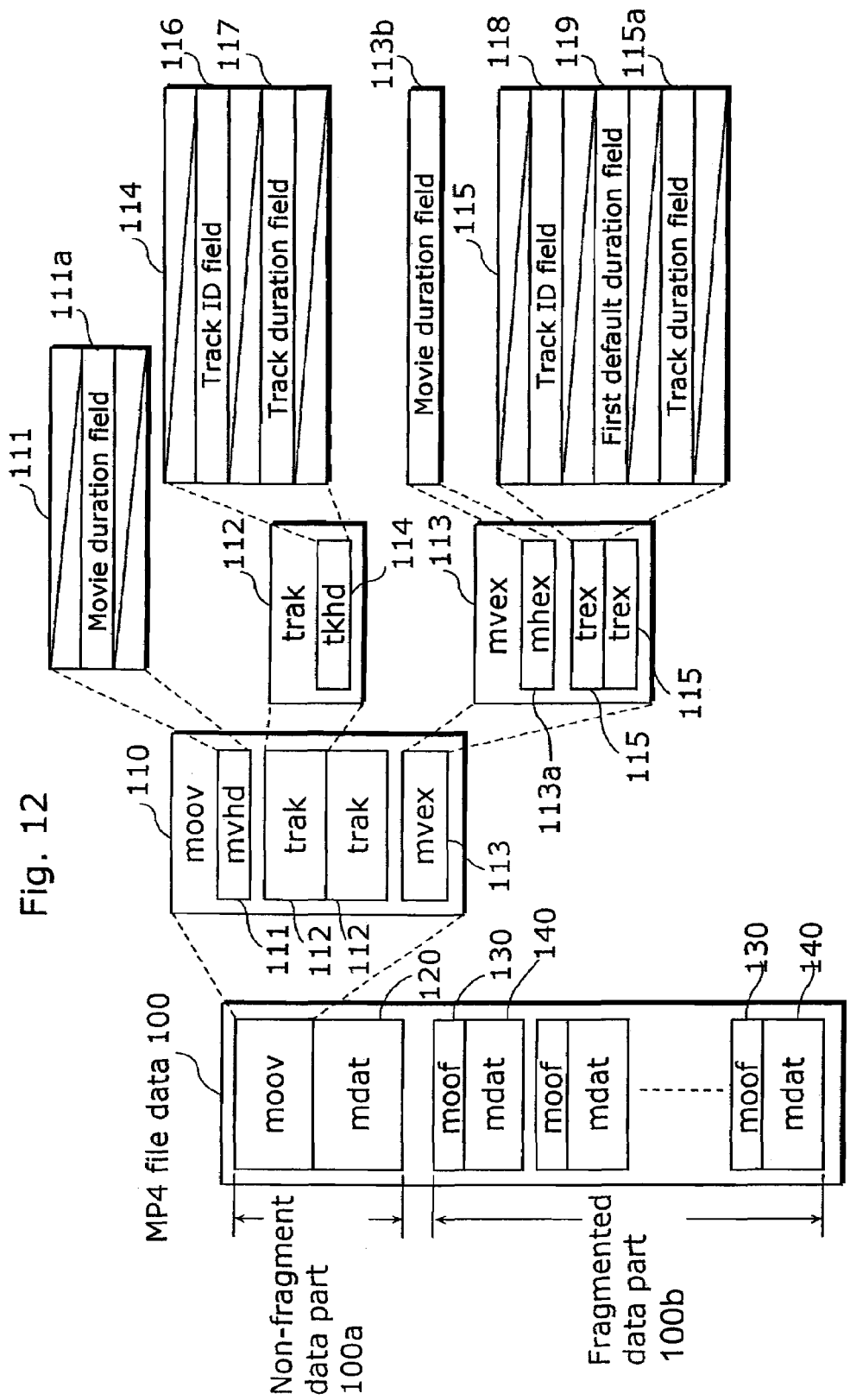
FIG. 12 is a data block diagram showing the file format of the MP4 file data handled by the demultiplexing apparatus and the multiplexing apparatus in accordance with an embodiment of the invention.

FIG. 12 is a data block diagram showing the file format of the MP4 file data handled by the demultiplexing apparatus and the multiplexing apparatus in the embodiment.

This MP4 file data 100 is composed of the non-fragment data part 100a and fragmented data part 100b and has the feature that the information indicating the total duration of the contents contained in the data 100 is stored in the non-fragment data part 100a. The user can know the total duration in the demultiplexing apparatus because of the existence of this information, which improves its userfriendliness. Also, apparatuses difficult to add this information such as multiplexing apparatus for recording in real time may omit adding the information.

The non-fragment data part 100a is composed of a media data box 120 (called "mdat" from here) where the multiplexed contents are stored and the movie box 110 (called "moov" from here) where the information on the contents of the mdat 120 are stored.

The moov 110 further includes a movie header box 111 (called "mvhd" from here), plural track box 112 (called "trak" from here) and a movie extend box 113 (called "mvex" from here).

The fragmented data part 100b is made in a way that plural pairs of a media data box 140 (called "mdat" from here) where the multiplexed contents are stored and a movie fragment box 130 (called "moof" from here) where the information on the contents of the mdat 140 are combined with each other like a chain. The moof 130 used here further includes f a movie fragment header box (called "mfhd" from here) and plural track fragment box (called "traf" from here) like the conventional example. In other words, fragmented data part 100b like this has the same structure as the conventional fragmented data part 900b.

The mvhd 111 in the moov 110 of the non-fragmented data part 100a contains a movie duration field 111a for storing the non-fragment content duration information indicating the duration needed to play back the contents contained in the non-fragment data part 100a (non-fragment content duration).

The trak 112 contains a track header box 114 (called "tkhd" from here). This tkhd 114 used here contains the track ID field 116 for storing the track identification information for identifying the track and the track duration field 117 for storing the non-fragment track duration information indicating the duration needed to play back the track of the non-fragment data part 100a (non-fragment track duration) indicated by the track identification information.

And, the mvex 113 contains the same number of track extend box 115 (called "trex" from here) as the number of the tracks contained in the fragmented data part 100b, and a movie extend header box 113a (called "mhex" from here).

The mhex 113a contains a movie duration field 113b for storing the fragmented content duration information indicating the duration (fragmented content duration) needed to play back the contents contained in the fragmented data part 100b. The fragmented content duration information used here may show "0", in this case, the fragmented content duration information indicates that the fragmented content duration is unknown.

The trex 115 includes a track ID field 118 for storing track identification information for identifying the track of the fragmented data part 100b, the first default duration field 119 for storing the default sample duration information indicating the duration preset as a default to the track sample of the fragmented data part 100b to be specified by the track identification information, and the track duration field 115a for storing the fragmented track duration information indicating the duration (fragmented track duration) needed to play back the track of the fragmented data part 100b specified by the track identification information.

In other words, the MP4 file data 100 in the embodiment has the feature that a mvex 113 contains mhex 113a where the fragmented content duration information is stored, further, the trex 115 of the mvex 113 contains the track duration field 115a where the fragmented track duration information is stored unlike the conventional example.

There is a case where the MP4 file data 100 is made up to only a non-fragment data part 100a when the information amount of the contents contained there is small, in this case, the mvex 113 of the moov 110 is omitted from the structure.

Figure 13:
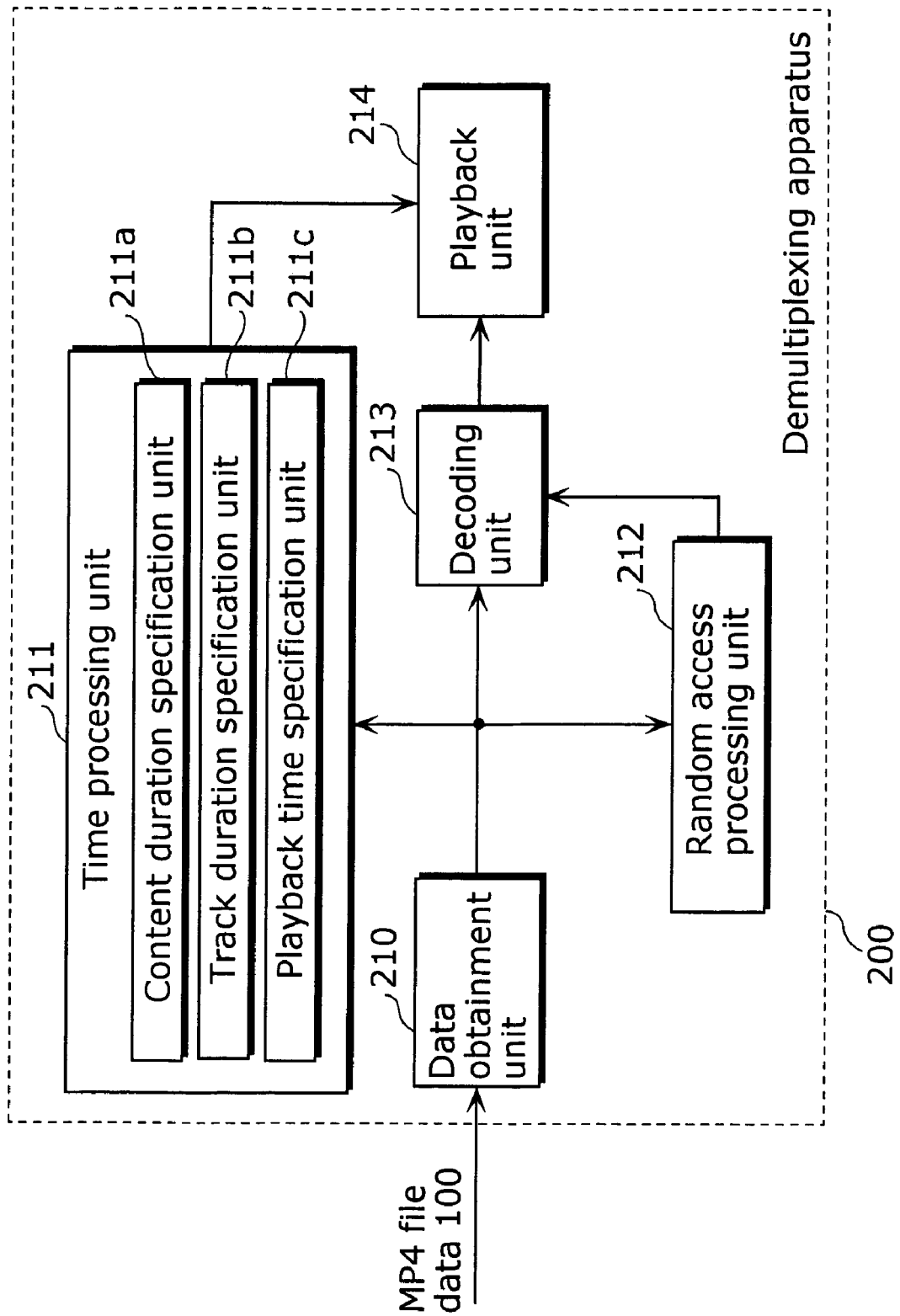
FIG. 13 is a block diagram showing the structure of the demultiplexing apparatus for performing playback based on the MP4 file data in accordance with an embodiment of the invention.

FIG. 13 is a block diagram showing the structure of the demultiplexing apparatus 200 for playing back the contents based on the above-mentioned MP4 file data 100 in the embodiment.

This demultiplexing apparatus 200 obtains and plays back the MP4 file data 100 and comprises a data obtainment unit 210 operable to obtain the MP4 file data 100 from the non-fragment data part 100a in order, a decoding unit 213 operable to demultiplex the MP4 file data 100 obtained in the data obtainment unit 210 into each pair of a moov 110 and a mdat 120 or each pair of a moof 130 and a mdat 140 in order and decode them, a time processing unit 211 operable to perform time processing based on the MP4 file data 100 obtained in the data obtainment unit 210, a random access processing unit 212 operable to perform a random access to the obtained MP4 file data 100, and a playback unit 214 operable to output video or audio based on the data outputted by the decoding unit 213.

The random access processing unit 212 stores all the MP4 file data 100 obtained in the data obtainment unit 210, searches the sample corresponding to the target time as the target sample out of the stored MP4 file data 100 when obtaining the target duration information indicating the target time from outside, and has the decoding unit 213 and the playback unit 214 play back the contents from the target sample.

Also, the time processing unit 211 includes a content duration specification unit 211a operable to specify the total duration needed to play back all the contents contained there based on the MP4 file data 100, a track duration specification unit 211b operable to specify the duration needed to play back all the tracks contained in the MP4 file data 100 track by track, and a playback time specification unit 211c operable to specify the playback duration.

Figure 14:
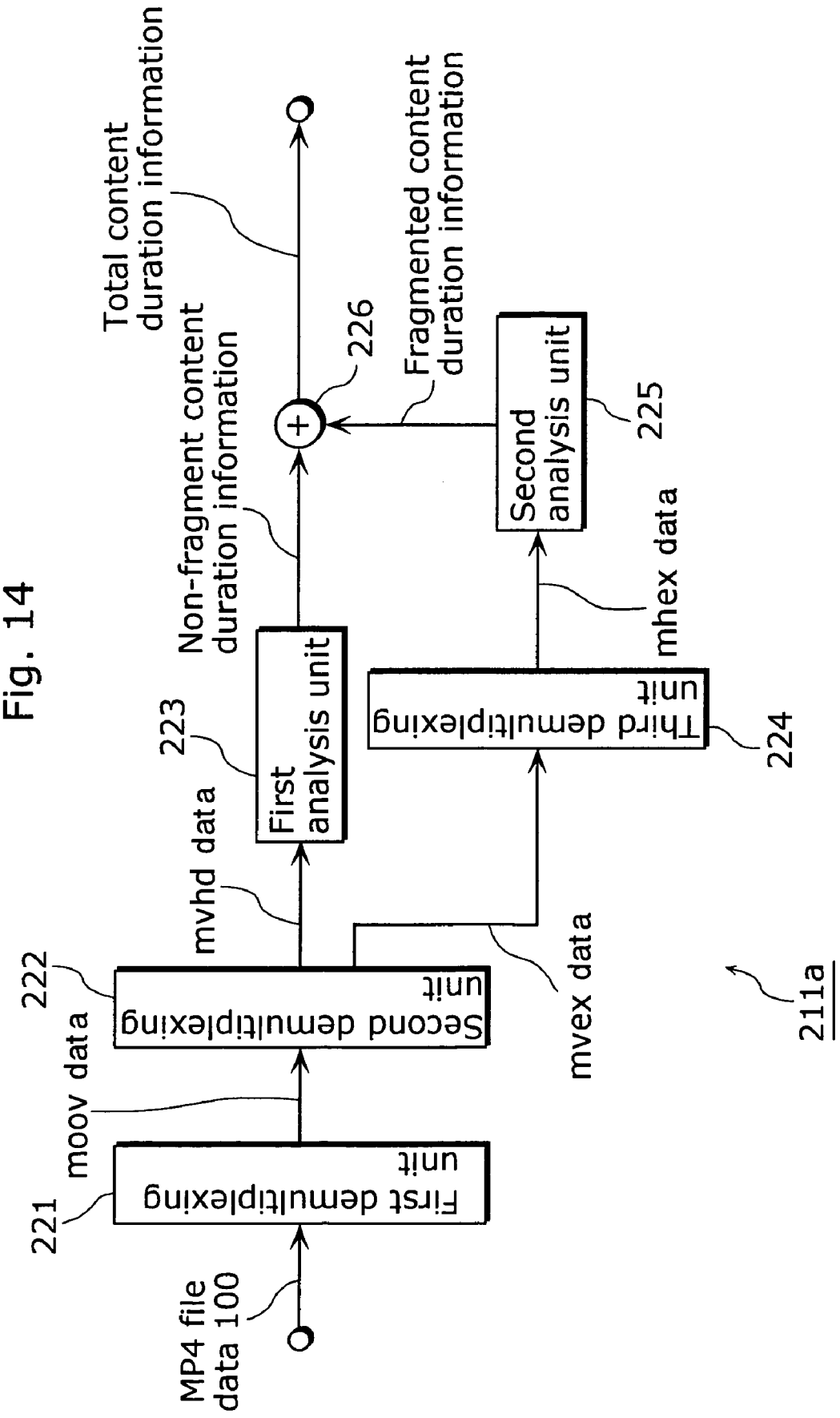
FIG. 14 is a block diagram showing the internal structure of the content duration specification unit of the time processing unit in accordance with an embodiment of the invention.

FIG. 14 is a block diagram showing the internal structure of the content duration specification unit 211a of the time processing unit 211.

The content duration specification unit 211a includes the first demultiplexing unit 221, the second demultiplexing unit 222, the third demultiplexing unit 224, the first analysis unit 223, the second analysis unit 225, and an addition unit 226.

The first demultiplexing unit 221 obtains the MP4 file data 100, and demultiplexes and outputs the data (moov data) stored in the moov 110 from the MP4 file data 100.

The second demultiplexing unit 222, upon obtaining the moov data, demultiplexes the data (mvhd data) stored in the mvhd 111 and the data (mvex data) stored in the mvex 113 from the moov data and outputs them.

The third demultiplexing unit 224, upon obtaining the mvex data, demultiplexes the data (mhex data) stored in the mhex 113a from the mvex data and outputs it.

The first analysis unit 223, upon obtaining the mvhd data from the second demultiplexing unit 222, analyzes the mvhd data and outputs the non-fragmented content duration information stored in the movie duration field 111a.

The second analysis unit 225, upon obtaining the mhex data from the third demultiplexing unit 224, analyzes the mhex data and outputs the fragmented content duration information stored in the movie duration field 113b.

The addition unit 226, upon obtaining the non-fragment content duration information and the fragmented content duration information from the first analysis unit 223 and the second analysis unit 225, adds the non-fragment content duration indicated in the non-fragment content duration information to the fragmented content duration indicated in the fragmented content duration information, and outputs the content total duration information indicating the duration after addition (total content duration). Also, the addition unit 226 outputs the non-fragment content duration information as the total content duration information when the fragmented content duration information shows "0".

In this way, the content duration specification unit 211a in the embodiment specifies the total content duration contained in the non-fragment data part 100a and the fragmented data part 100b of the MP4 file data 100 and outputs the total content duration information indicating the total content duration.

Figure 15:
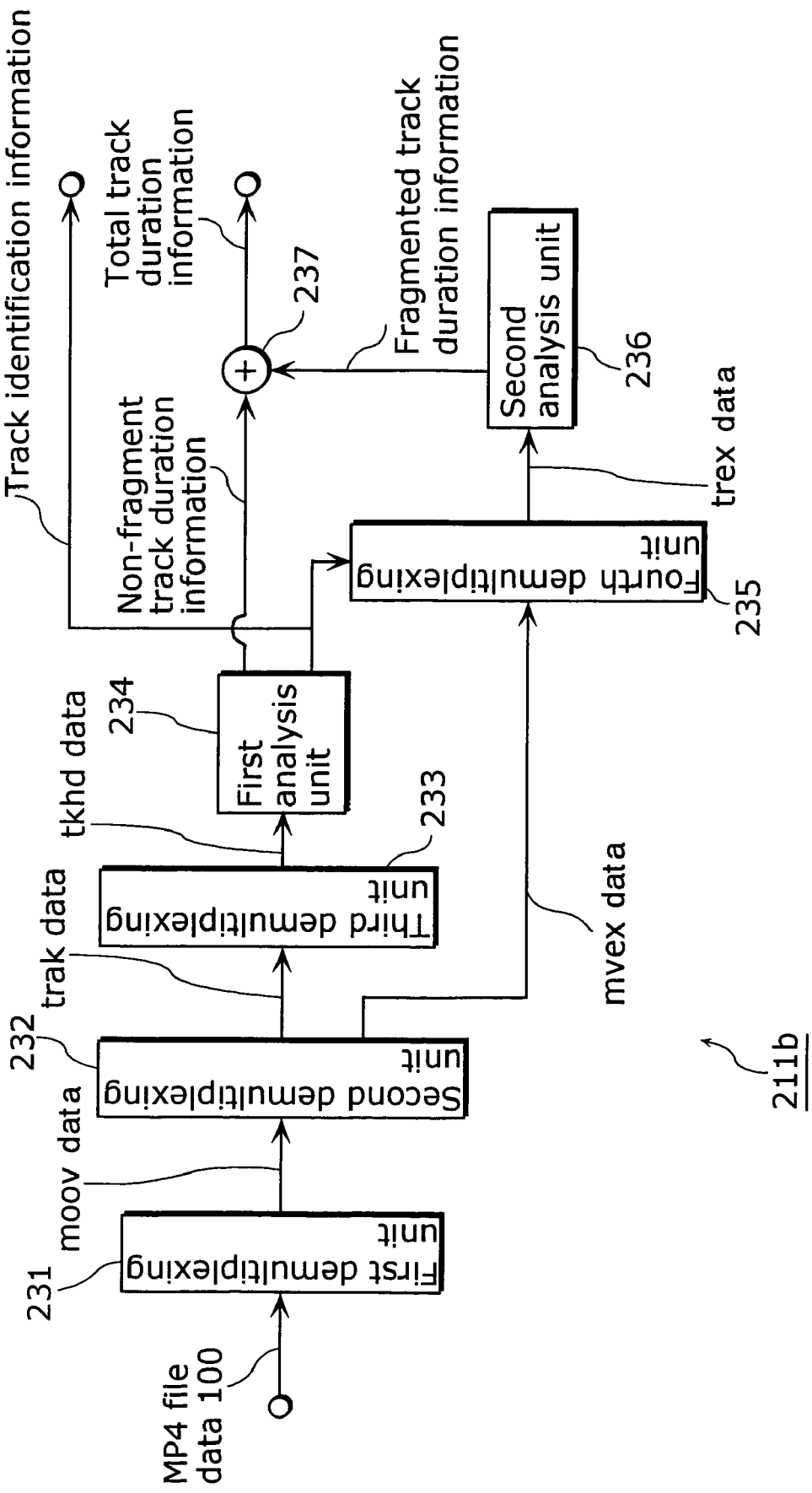
FIG. 15 is a block diagram showing the internal structure of the track duration specification unit of the time processing unit in accordance with an embodiment of the invention.

FIG. 15 is a block diagram showing the internal structure of the track duration specification unit 211b of the time processing unit 211.

The track duration specification unit 211b includes the first demultiplexing unit 231, the second demultiplexing unit 232, the third demultiplexing unit 233, the fourth demultiplexing unit 235, the first analysis unit 234, the second analysis unit 236 and the addition unit 237.

The first demultiplexing unit 231 obtains the MP4 file data 100, demultiplexes the moov data from the MP4 file data 100 and outputs it.

The second demultiplexing unit 232, upon obtaining the moov data, demultiplexes the data (trak data) stored in the trak 112 and the mvex data from the moov data and outputs them.

The third demultiplexing unit 233, upon obtaining the trak data, demultiplexes the data (tkhd data) stored in the tkhd 114 from the trak data and outputs it.

The first analysis unit 234, upon obtaining the tkhd data from the third demultiplexing unit 233, analyzes the tkhd data and outputs the track identification information stored in the track ID field 116 of the tkhd114. Further, the first analysis unit 234 extracts the non-fragment track duration information corresponding to the track specified by the track identification information from the track duration field 117 of the tkhd 114 and outputs it.

The fourth demultiplexing unit 235, upon obtaining the mvex data from the second demultiplexing unit 232 and track identification information from the first analysis unit 234, demultiplexes the data (trex data) stored in the trex 115 corresponding to the track specified in the track identification information from the mvex data and outputs it.

The second analysis unit 236, upon obtaining the trex data from the fourth demultiplexing unit 235, analyzes the trex data and outputs the fragmented track duration information stored in the track duration field 115a.

The addition unit 237, upon obtaining the non-fragment track duration information from the first analysis unit 234 and the fragmented track duration information from the second analysis unit 236, adds the duration indicated in the non-fragment track duration information to the duration indicated in the fragmented track duration information, and outputs the total track duration information indicating the duration after addition (total track duration).

In this way, the track duration specification unit 211b in the present embodiment specifies track total duration contained in the non-fragment data part 100a and the fragmented data part 100b of the MP4 file data 100 track by track and outputs the track identification information indicating these tracks and total track duration information indicating the total track duration of these tracks.

Figure 16:
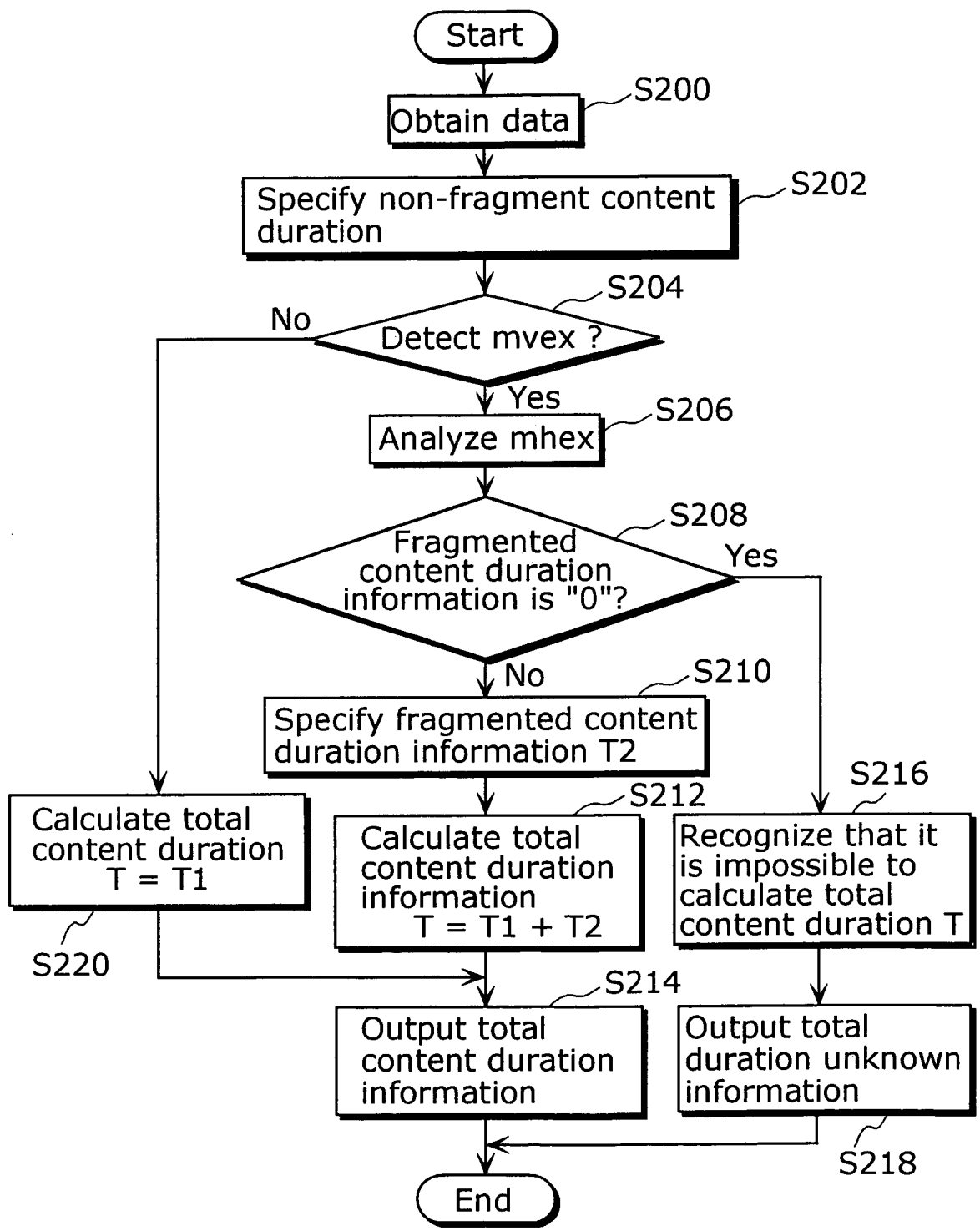
FIG. 16 is a flow chart showing the characteristic operation of the content duration specification unit of the demultiplexing apparatus in accordance with an embodiment of the invention.

FIG. 16 is a flow chart showing the characteristic operation of the content duration specification unit 211a of the demultiplexing apparatus 200 in this embodiment.

First, the content duration specification unit 211a obtains the MP4 file data 100 (step S200), analyses the mvhd 111 of the data 100 and specifies the non-fragment content duration T1 (step S202).

Next, the content duration specification unit 211a judges whether or not the mvex 113 is contained in the moov 110 of the data 100 obtained in the step S200 (step S204).

The content duration specification unit 211a used here, on detecting the mvex 113 (step S204: Yes), judges that the MP4 file data 100 is composed of the non-fragment data part 100a and the fragmented data part 100b, further, by analyzing the mhex 113a contained in the mvex 113 (step S206), judges whether or not the fragmented content duration information stored in the movie duration field 113b shows "0" (step S208).

The content duration specification unit 211a, on judging that the fragmented content duration information does not shows "0" (step S208: No), specifies the fragmented content duration T2 from the fragmented content duration information (step S210).

After that, the content duration specification unit 211a adds the non-fragment content duration T1 to the fragmented content duration T2, calculates the total content duration T (step S212), and outputs the total content duration information indicating the total content duration T (step S214).

Meanwhile, when the mvex 113 is not detected in the step S204 (step S204: No), the content duration specification unit 211a judges that the MP4 file data 100 is made from the non-fragment data part 100a, handles the non-fragment content duration T1 as the total content duration T (step S220), and outputs the total content duration information (step S214).

After that, when the content duration specification unit 211a judges that the fragmented content duration information shows "0" in the step S208 (step S208: Yes), it judges that it is impossible to calculate the total content duration T (step S216), and outputs the total duration unknown information indicating that the total content duration T is unknown (step S218).

Here, the playback unit 214 of the demultiplexing apparatus 200 in this embodiment outputs video or audio based on the data from the decoding unit 213, displays the playback time specified by the playback time specification unit 211c, and displays the total content duration indicated by the total content duration information when the total content duration information is outputted from the content duration specification unit 211a, or indicates that the total content duration is unknown when the total duration unknown information is outputted from the content duration specification unit 211a.

Figure 17:
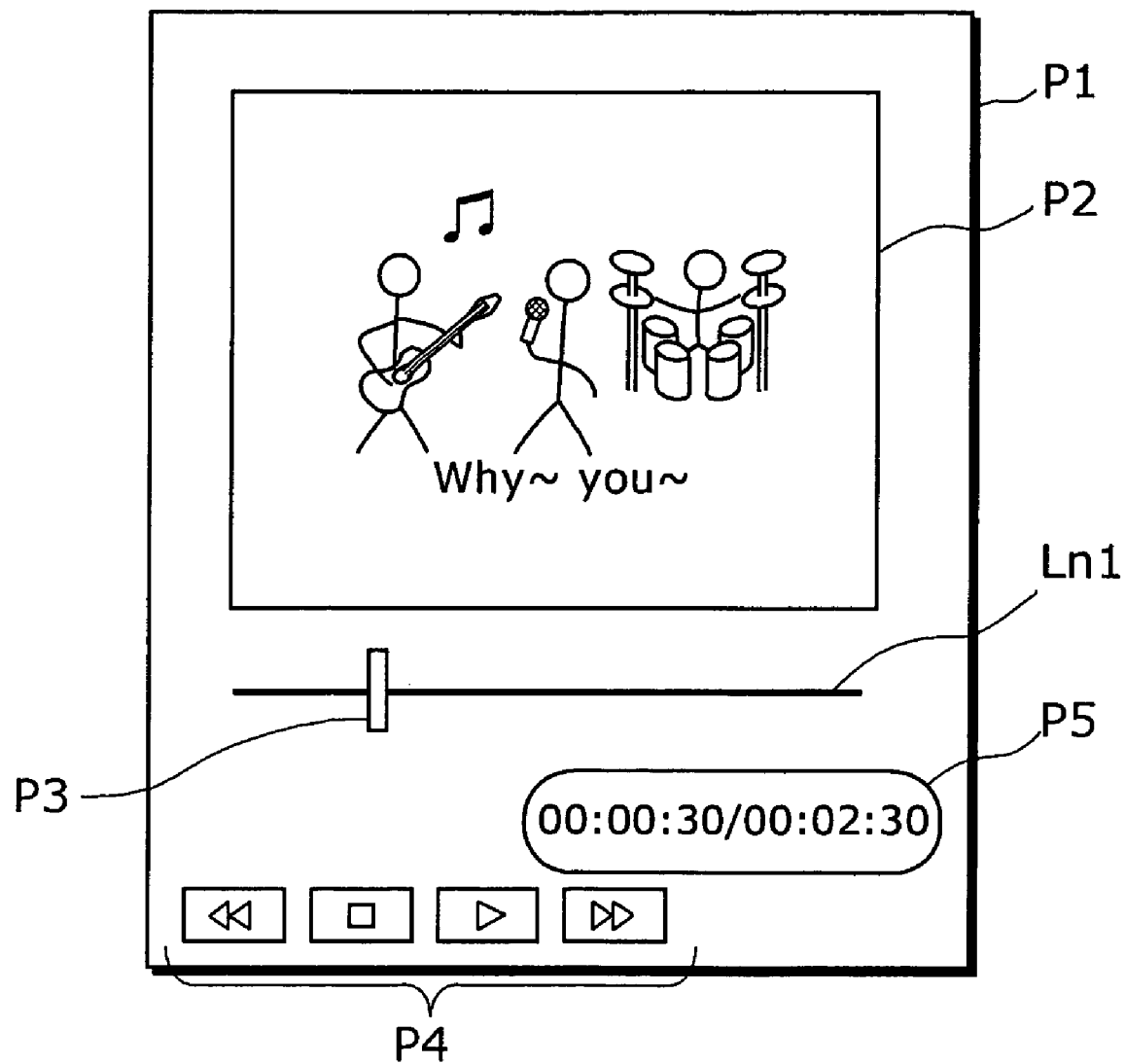
FIG. 17 is a video display diagram showing the video displayed by the playback unit of the demultiplexing apparatus in accordance with an embodiment of the invention.

FIG. 17 is a video display diagram showing the video displayed by the playback unit 214 when the total content duration information is outputted.

The playback unit 214 displays the display screen P1 for displaying the playback video, and displays a playback video display unit P2 where the playback video is displayed, a slider bar P3, an operation button P4, and a time display unit P5 on the display screen P1.

The total content duration such as "00:02:30" is displayed in the right part of the time display unit P5, and the playback time such as "00:00:30" is displayed in the left part of the time display unit P5.

The slider bar P3 slides from the left to the right on the line Ln1 according to the ratio of the playback time to the total content duration.

Figure 18:
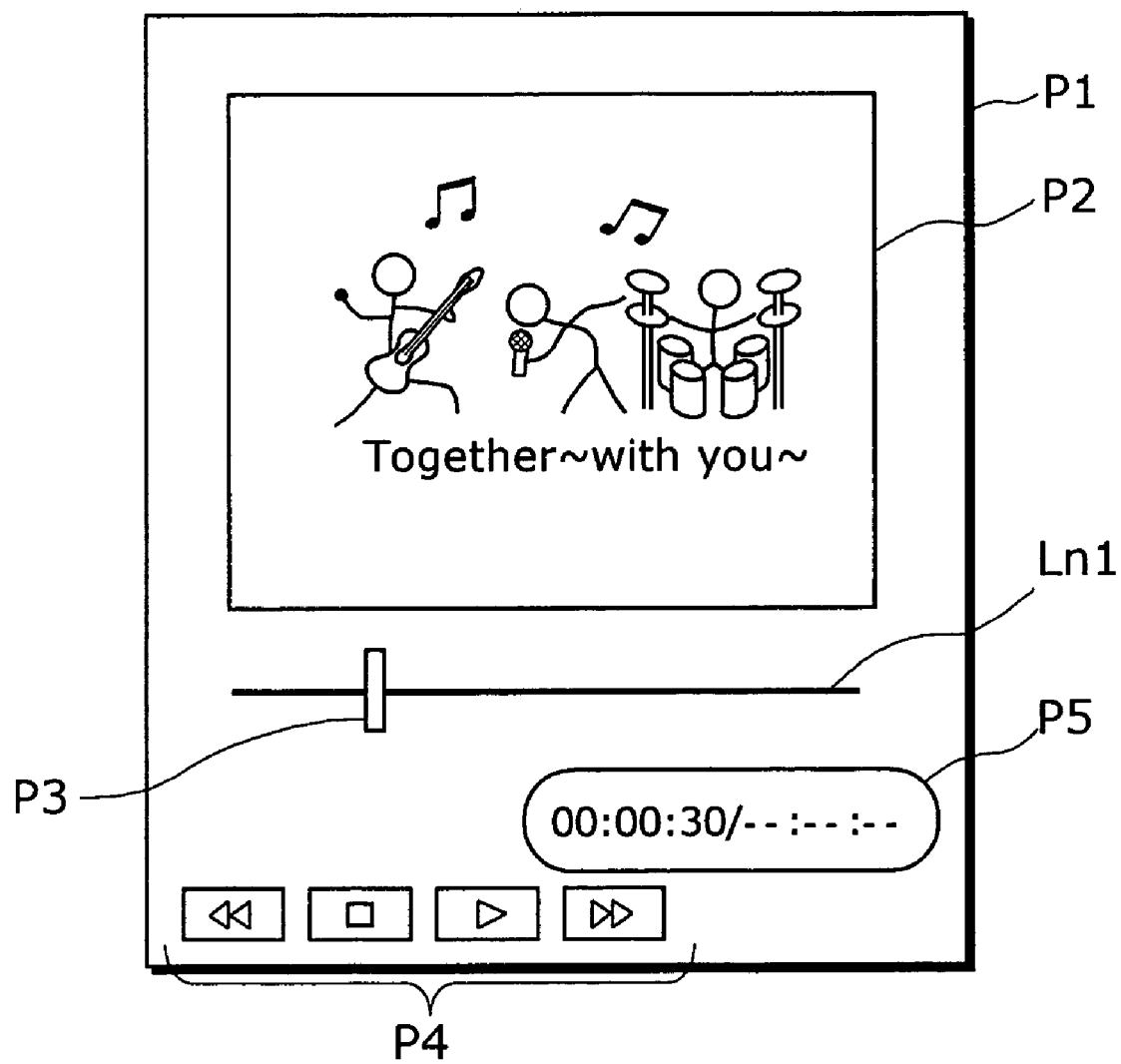
FIG. 18 is a video display diagram showing another video displayed by the playback unit of the demultiplexing apparatus in accordance with an embodiment of the invention.

FIG. 18 is a video display diagram showing the video displayed by the playback unit 214 when the total duration unknown information is outputted.

The playback unit 214 displays the display screen P1 contains the playback video display unit P2, the slider bar P3, the operation button P4 and the time display unit P5 like mentioned above, but it indicates letters or signs such as "--:--:--" indicating that the total content duration is unknown in the right part of the time display unit P5. Also, the playback unit 214 displays the playback time such as "00:00:30" in the left part of the time display unit P5.

Also, the slider bar P3 slides from the left to the right on the line Ln1 in the FIG. 18 according to the ratio of the playback time to the predetermined time, and repeatedly exerts sliding from the left to the right in the FIG. 18 each time the above-mentioned predetermined time passes.

Also, the playback unit 214, when obtaining the track identification information and the total track duration information from the track duration specification unit 211b, displays the total track duration indicated by the total track duration information for each track indicated in the track identification information as the need arises.

In this way, the demultiplexing apparatus 200 in the embodiment can perform download playback when starting the download of the MP4 file data 100, display the total content duration based on the total content duration information stored in the moov 110 of the MP4 file data 100 even before completing download of all the MP4 file data 100, and improve the userfriendliness.

Next, the multiplexing apparatus 300 for making the MP4 file data 100 in the embodiment will be explained.

Figure 19:
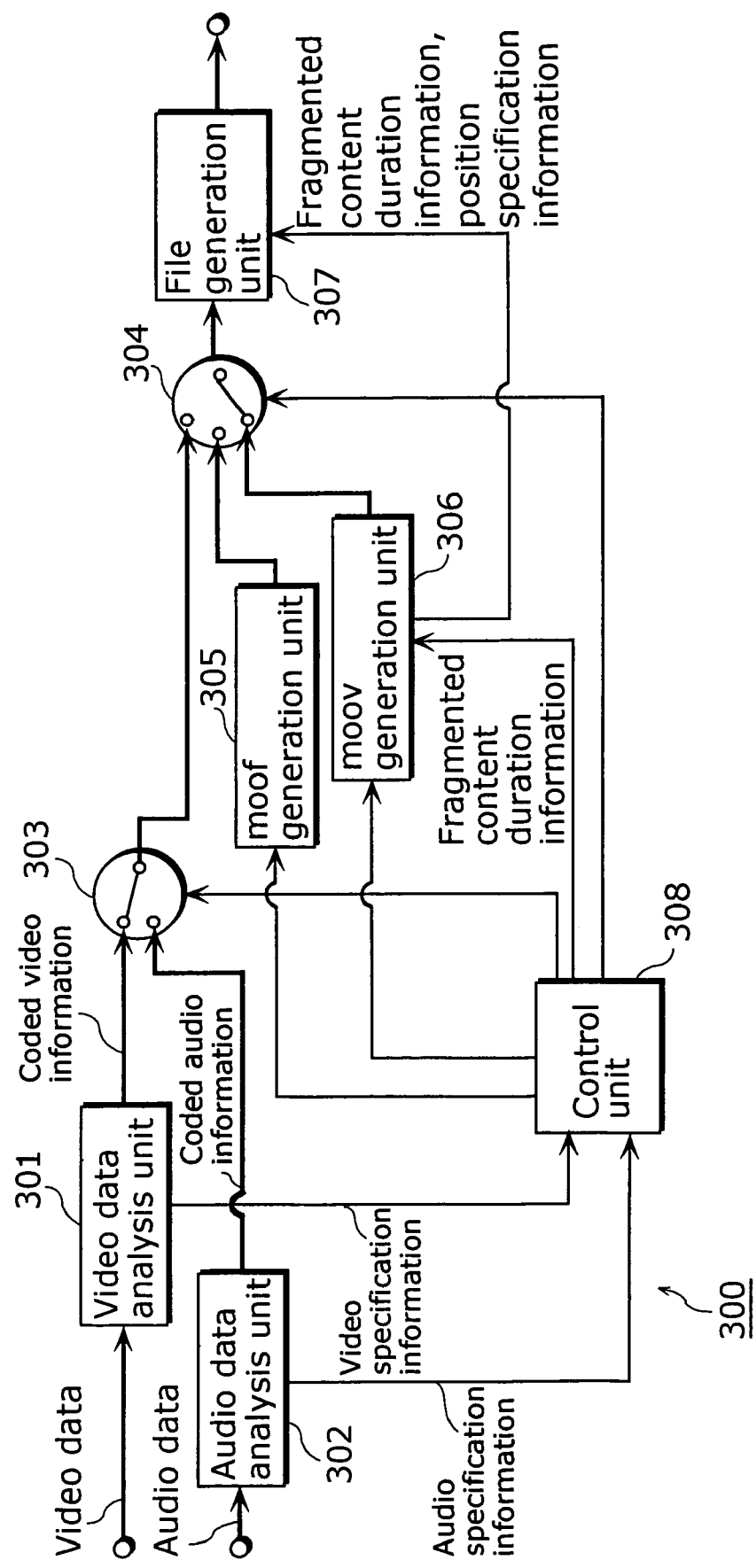
FIG. 19 is a block diagram showing the structure of the multiplexing apparatus in accordance with an embodiment of the invention.

FIG. 19 is a block diagram showing the structure of the multiplexing apparatus 300 in the embodiment.

The multiplexing apparatus 300 in this embodiment comprises a video data analysis unit 301, an audio data analysis unit 302, the first selector switch 303, the second selector switch 304, a control unit 308, a moof generation unit 305, a moov generation unit 306 and a file generation unit 307.

The video data analysis unit 301 generates the video specification information indicating the time stamp and the size of the video data by obtaining and analyzing the video data. After that, the video data analysis unit 301 codes the video data and makes the video coded data, and then outputs the video coded data and the video specification information.

The audio data analysis unit 302 generates the audio specification information indicating the time stamp and the size of the audio data by obtaining and analyzing the audio data. After that, the audio data analysis unit 302 codes the audio data and makes the audio coded data, and then outputs the audio coded data and the audio specification information.

The moov generation unit 306 generates the moov data based on the control from the control unit 308 and outputs it. The moov generation unit 306 in the embodiment here generates mhex 113a in the mvex 113 of the moov data.

The moof generation unit 305 generates the moof data based on the control from the control unit 308 and outputs it.

The control unit 308 obtains the video specification information from the video data analysis unit 301 and the audio specification information from the audio data analysis unit 302, outputs the data to be stored in the non-fragment data part 100a that contains the moov data first from the second selector switch 304 by switching the first selector switch 303 and the second selector switch 304 based on the video specification information and the audio specification information, and outputs the data to be stored in the fragmented data part 100b that contains the moof data next.

The control unit 308 in the embodiment here, when having the moov generation unit 306 output the moov data, has the moov generation unit 306 generate the moov data that enables the fragmented content duration information to be stored in the movie duration field 113b of the mhex 113a to show "0", and has the moov generation unit 306 output the moov data.

After that, the control unit 308 adds, in order, the durations of the respective samples to be stored in the fragmented data part 100b of the video coded data and the audio coded data based on the video specification information and the audio specification information.

Next, the control unit 308 has the moof generation unit 305 output the moof data for all the inputted audio data and video data, regards the duration added as mentioned above as the fragmented content duration, and output the fragmented content duration information indicating the fragmented content duration to the moov generation unit 306.

After that, the moov output unit 306 that obtained the fragmented content duration information from the control unit 308 outputs, to the file generation unit 307, the fragmented content duration information and the position specification information indicating the position of the movie duration field 113b of the mhex 113a where the information is stored.

The file output unit 307, upon obtaining the fragmented content duration information and the position specification information from the moov generation unit 306, overwrites the obtained fragmented content duration information on the movie duration field 113b of the mhex 113a indicated in the position specification information. In other words, the file generation unit 307 changes the fragmented content duration information showing "0" to the later-obtained fragmented content duration information, and then it completes the MP4 file data 100.

Figure 20:
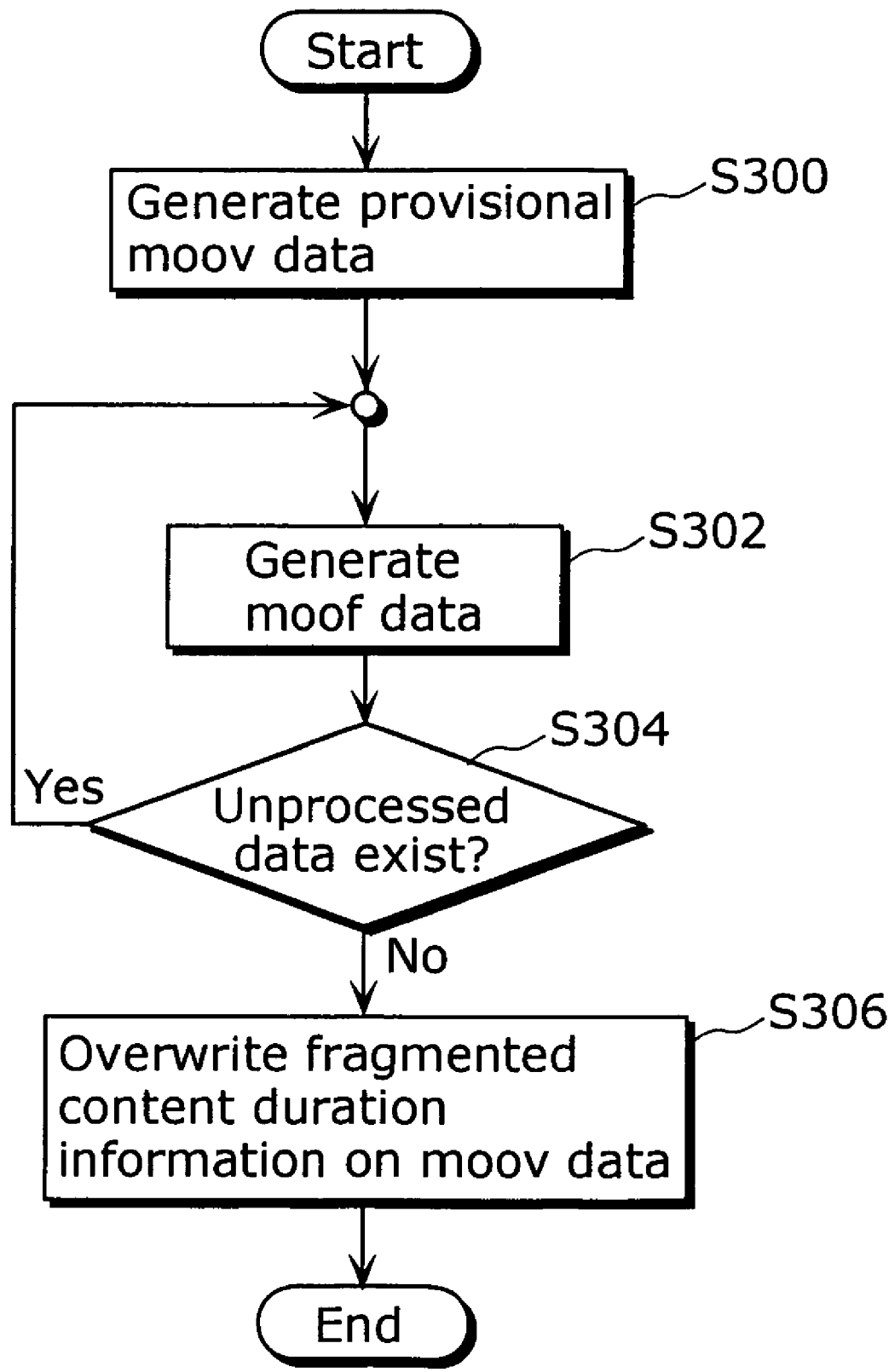
FIG. 20 is a flow chart showing the operation of the multiplexing apparatus in accordance with an embodiment of the invention.

FIG. 20 is a flow chart showing the operation of the multiplexing apparatus 300 in the embodiment.

First, the multiplexing apparatus 300 generates the moov data that contains the fragmented content duration information showing "0" (step S300). In other words, the multiplexing apparatus 300 generates a provisional moov data first.

Next, the multiplexing apparatus 300 generates the moof data (step S302).

After that, the multiplexing apparatus 300 judges whether or not there remains unprocessed data in the inputted video data and audio data to be coded and multiplexed (step S304). The multiplexing apparatus 300 repeatedly exerts the operation from step S302 when judging that there remains unprocessed data (step S304: Yes), while it overwrites the fragmented content duration information (step S306) based on the addition result of the sample durations on the moov data and then finishes the processing when judging that there remains no unprocessed data (step S302: No).

As the multiplexing apparatus 300 in the embodiment like this generates the MP4 file data 100 made in a way that a pair of a moov 110 and a mdat 120 and at least a pair of a moof 130 and a mdat 140 are connected to each other according to the information amounts of the contents, the multiplexing apparatus 300 is effective for a real time recording and can store the fragmented content duration information needed to improve the userfriendliness of the demultiplexing apparatus 200 in the moov 110.

FIG. 21 is a display diagram showing the syntax of the trex.

To the track duration field 115a of the trex 115, 32 bit or 64 bit is assigned according to the version, and 32 bit is assigned to the first default duration field 119. Also, a time scale is indicated by the mvhd111.

While the mhex 113a that contains the fragmented content duration information is stored in the mvex 113 of the MP4 file data 100 in this embodiment, a box (called "mehd" from here) that contains the total content duration information may be stored instead of in the mhex 113a.

FIG. 22 is a block diagram showing the internal structure of the content duration specification unit operable to specify the total content duration based on the MP4 file data that contains the mehd.

The content duration specification unit 211a' includes the first demultiplexing unit 211', the second demultiplexing unit 222', the third demultiplexing unit 224', and an analysis unit 225'. The first demultiplexing unit 221' obtains the MP4 file data, demultiplexes the moov data from the MP4 file data, and outputs the moov data. The second demultiplexing unit 222', upon obtaining the moov data, demultiplexes the mvex data from the moov data and outputs the mvex data. The third demultiplexing unit 224', upon obtaining the mvex data, demultiplexes the mehd data stored in the above-mentioned mehd from the mvex data and outputs the mehd data. The analysis unit 225', upon obtaining the mehd data from the third demultiplexing unit 224', analyzes the mehd data and outputs the total content duration information.

Figure 23:
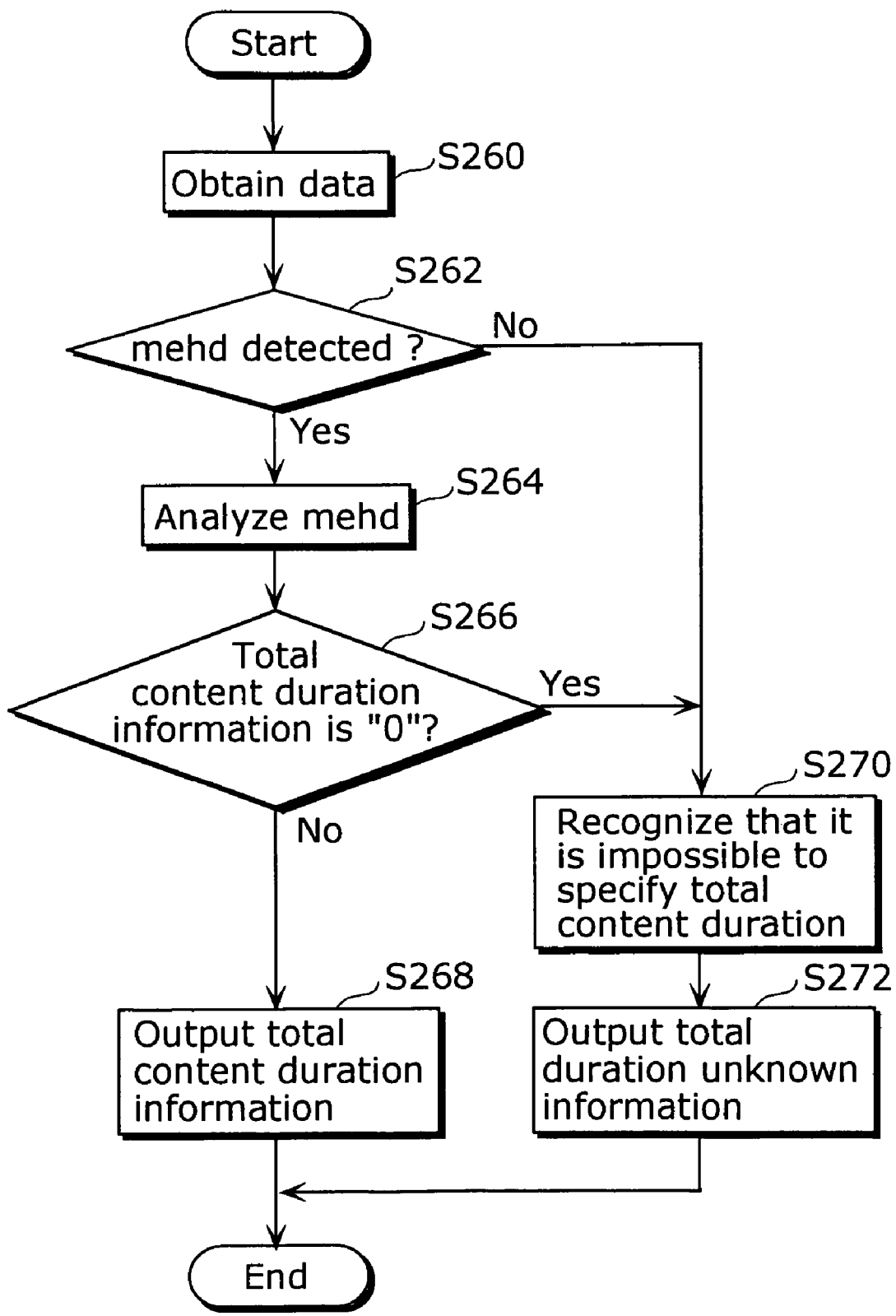
FIG. 23 is a flow chart showing the characteristic operation of the content duration specification unit in accordance with an embodiment of the invention.

FIG. 23 is a flow chart showing the characteristic operation of the above-mentioned content duration specification unit 211a'.

First, the content duration specification unit 211a' obtains the above-mentioned MP4 file data (step S260), and judges whether or not the mehd is contained in the data (step S262).

Here, the content duration specification unit 211a', on detecting the mehd (step S262: Yes), analyzes the mehd (step S264), and judges whether or not the total content duration information stored in the mehd shows "0" (step S266).

After that, the content duration specification unit 211a', when judging that the total content duration information does not show "0" in the step S266 (step S266: No), outputs the total content duration information (step S268). On the other hand, the content duration specification unit 211a' judges that it is impossible to specify the total content duration (step S270) and outputs total duration unknown information indicating that the total content duration is unknown (step S272) when judging that the mehd is not contained in the data in the step S262 (step S262: No) or when judging that the total content duration information shows "0" in the step S266 (step S266: Yes).

In this way, by storing the mehd in the MP4 file data instead of the mhex 113a, the content duration specification unit 211a' can easily specify the total content duration by analyzing the mehd data without adding the content duration of the non-fragment data part 100a to the content duration of the fragmented data part 100b so as to specify the total content duration.

On the other hand, the control unit 308 of the multiplexing apparatus 300, when generating the moov data in the moov generation unit 306, generates the moov data so that the total content duration information to be stored in the mehd shows "0" in the moov generation unit 306 first, and adds respective sample durations to be stored in the non-fragment data part 100a and the fragmented data part 100b of the video coded data and the audio coded data in order based on the video specification information and the audio specification information. After that, the control unit 308, on outputting the moof data for all the inputted audio data and video data from the moof generation unit 305, regards the duration added as mentioned above as the total content duration, and outputs the total content duration information indicating the duration to the moov generation unit 306. In this way, the file generation unit 307 of the multiplexing apparatus 300 generates the MP4 file data 100 for storing the above-mentioned mehd.

FIG. 24 is a display diagram showing the syntax of the mehd.

To the movie duration field for storing the total content duration information of the mehd, 32 bit or 64 bit is assigned according to the version. For example, 32 bit is assigned when the version shows "0", or 64 bit is assigned when the version shows "1". Also, the time scale is indicated by the mvhd.

Note that the mhex 113a can have the syntax as shown in FIG. 24.

Also, the fragmented content duration is unknown when the fragmented content duration information shows "0" in the above-mentioned embodiment, but the value can be the one except "0" such as a negative value.

(Variation)

Next, the variation of the demultiplexing apparatus 200 in the embodiment will be explained.

The above-mentioned demultiplexing apparatus 200 uses the MP file data whose structure of the non-fragment data part differs from the conventional file format, but the demultiplexing apparatus concerning this variation further uses the MP4 file data whose structures of the non-fragment part and the fragmented part differ from the conventional file format.

Figure 25:
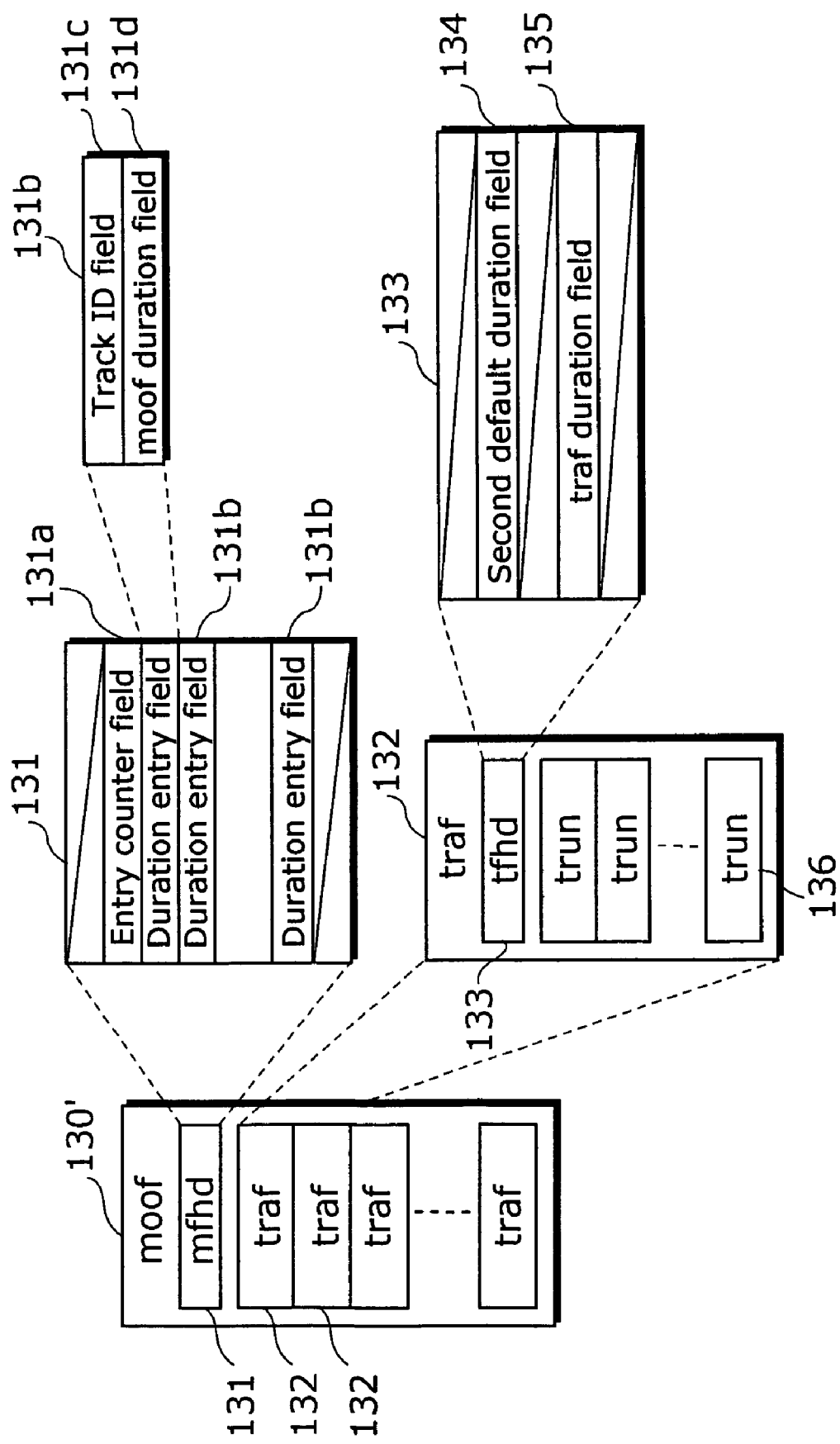
FIG. 25 is a data block diagram showing the file format of the moof of the MP4 file data handled by the demultiplexing apparatus concerning the variation in accordance with an embodiment of the invention.

FIG. 25 is a data block diagram showing the file format of the moof of the MP4 file data used by the demultiplexing apparatus concerning this variation.

The moof 130' is composed of a mfhd 131 and plural traf 132.

The mfhd 131 is composed of an entry counter field 131a and plural duration entry field 131b. Further, in the duration entry field 131b, a track ID field 131c for storing track identification information for identifying a track and a moof duration field 131d for storing the moof duration information indicating the track duration (moof duration) specified by the track identification information in the mdat 140 pairing up with the moof 130'.

The traf 132 is composed of a track fragment header box 133 (called "tfhd" from here) and plural track fragment run box 136 (called "trun" from here), the tfhd 133 contains a traf duration field 135 where the traf duration information is stored and the second default duration field 134 where the default sample duration information is stored.

The traf duration information stored in the traf duration field 135 indicates the addition result (traf duration) of the sample duration indicated in the sample duration information contained in the trun 136 of the traf 132, and the default sample duration information stored in the second default duration field 134 indicates the duration to the traf duration set as a default.

Figure 26:
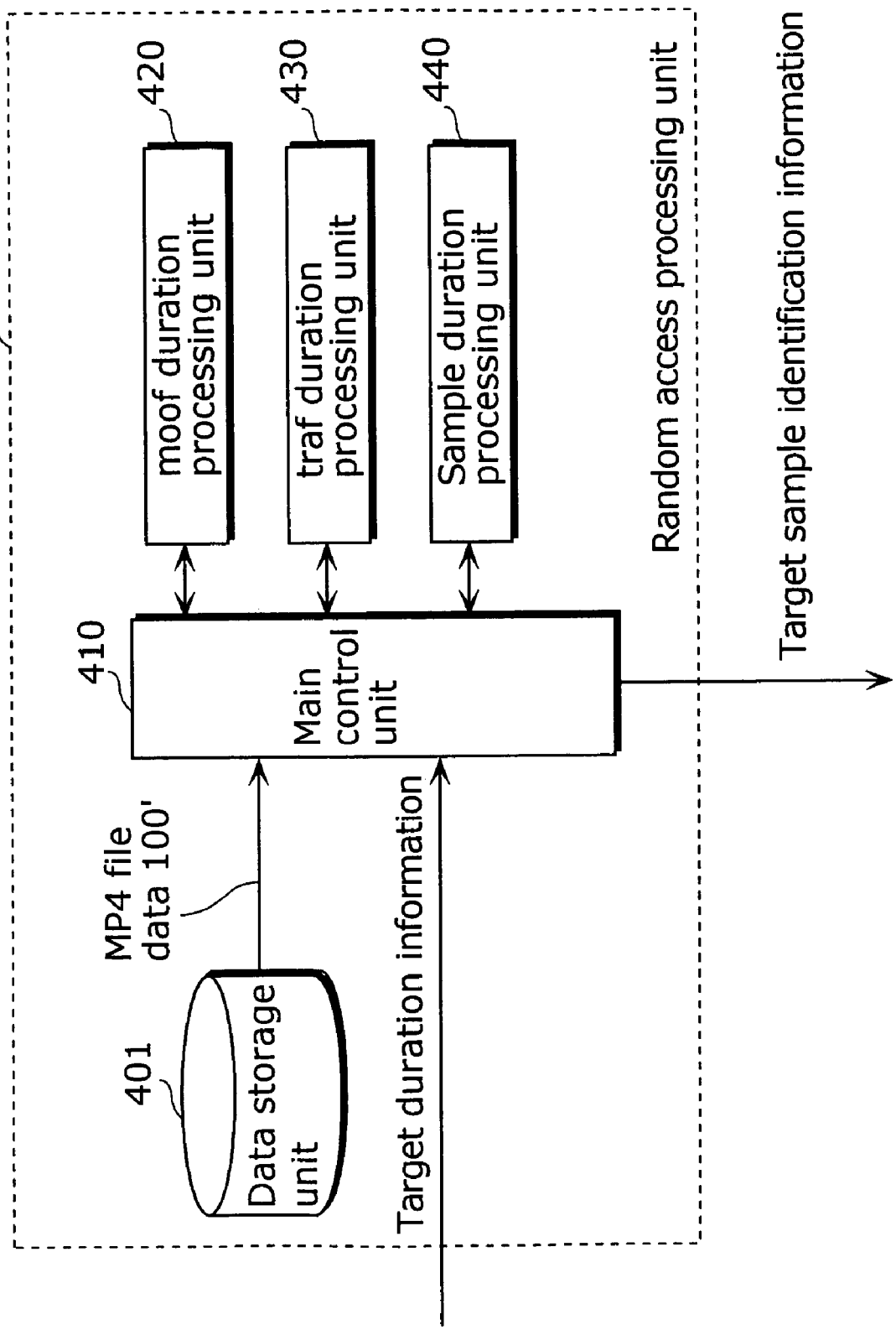
FIG. 26 is a block diagram showing the internal structure of the random access processing of the demultiplexing apparatus concerning the variation in accordance with an embodiment of the invention.

FIG. 26 is a block diagram showing the internal structure of the random access processing unit of the demultiplexing apparatus concerning this variation.

The random access processing unit 400 can reduce the calculation amount compared to the conventional random access processing unit 812 and quickly search the target sample. The random access processing unit 400 comprises a data storage unit 401 operable to store the MP4 file data 100' with the moof 130' shown in FIG. 25, a moof duration processing unit 420 operable to specify the moof duration, a traf duration processing unit 430 operable to specify the traf duration, a sample duration processing unit 440 operable to specify the sample duration, and a main control unit 410 operable to control these processing units.

The main control unit 410, upon obtaining the MP4 file data 100' and the target duration information indicating the target time, analyses the structure of the MP4 file data 100', controls the moof duration processing unit 420, the traf duration processing unit 430 and the sample duration processing unit 440, and outputs the target sample identification information indicating the target sample according to the above-mentioned target time by performing addition processing of the moof duration, the traf duration and the sample duration specified by respective one of these processing units.

Figure 27:
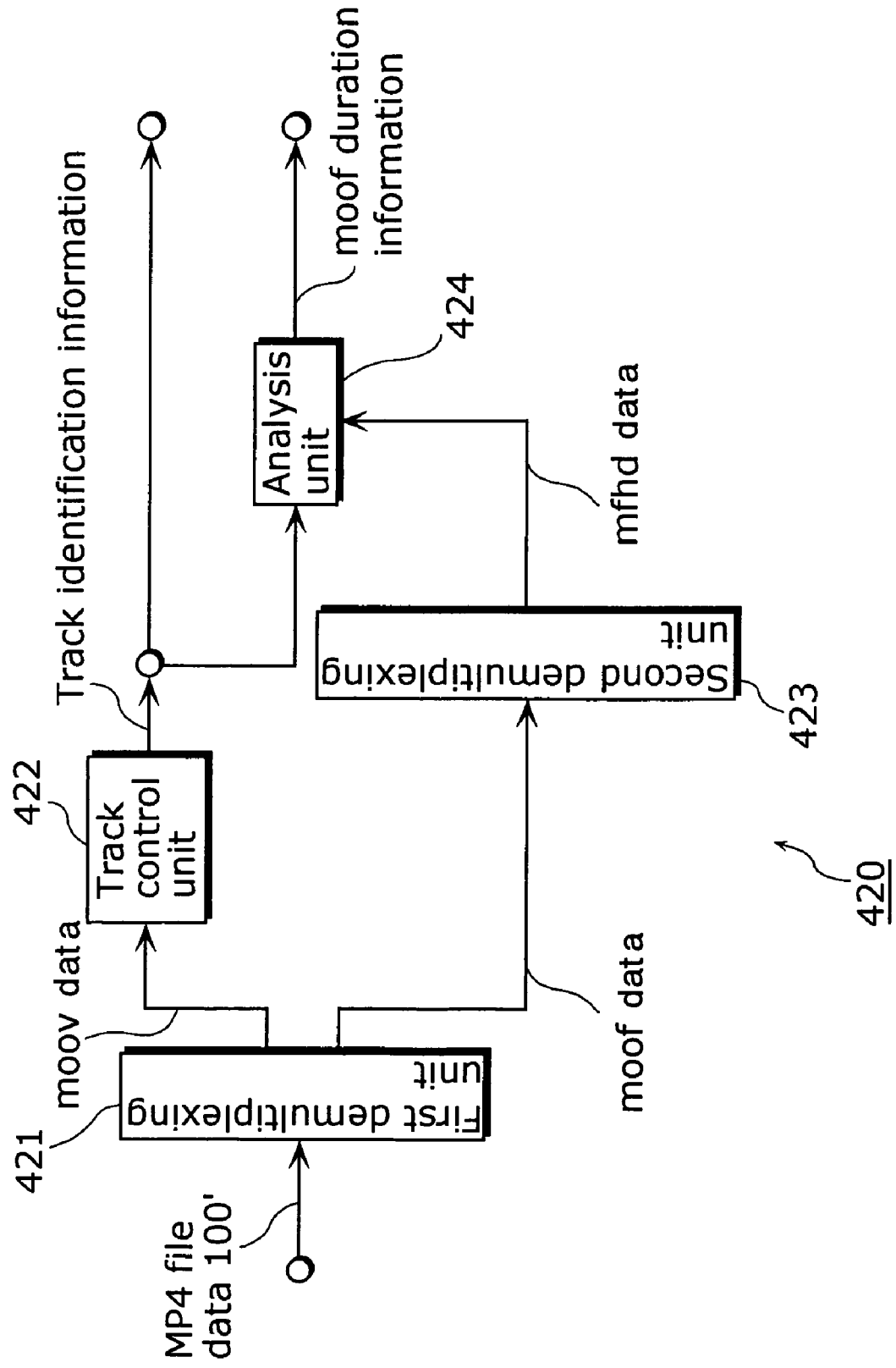
FIG. 27 is a block diagram showing the internal structure of the moof duration processing unit concerning the variation in accordance with an embodiment of the invention.

FIG. 27 is a block diagram showing the internal structure of the moof duration processing unit 420.

The moof duration processing unit 420 comprises the first demultiplexing unit 421, the second demultiplexing unit 423, a track control unit 422, and an analysis unit 424.

The first demultiplexing unit 421, upon obtaining the MP4 file data 100' with the moof 130' in FIG. 25, demultiplexes the moov data and the moof data from the MP4 file data 100' and outputs them.

The second demultiplexing unit 423, upon obtaining the moof data from the first demultiplexing unit 421, demultiplexes the data (mfhd data) stored in the mfhd 131 from the moof data and outputs it.

The track control unit 422, upon obtaining the moov data from the first demultiplexing unit 421, outputs the track identification information based on the moov data.

The analysis unit 424 obtains the mfhd data from the second demultiplexing unit 423 and the track identification information from the track control unit 422, analyzes the mfhd data, extracts the moof duration information of the track specified by the track identification information from the mfhd data, and outputs the moof duration information.

Figure 28:
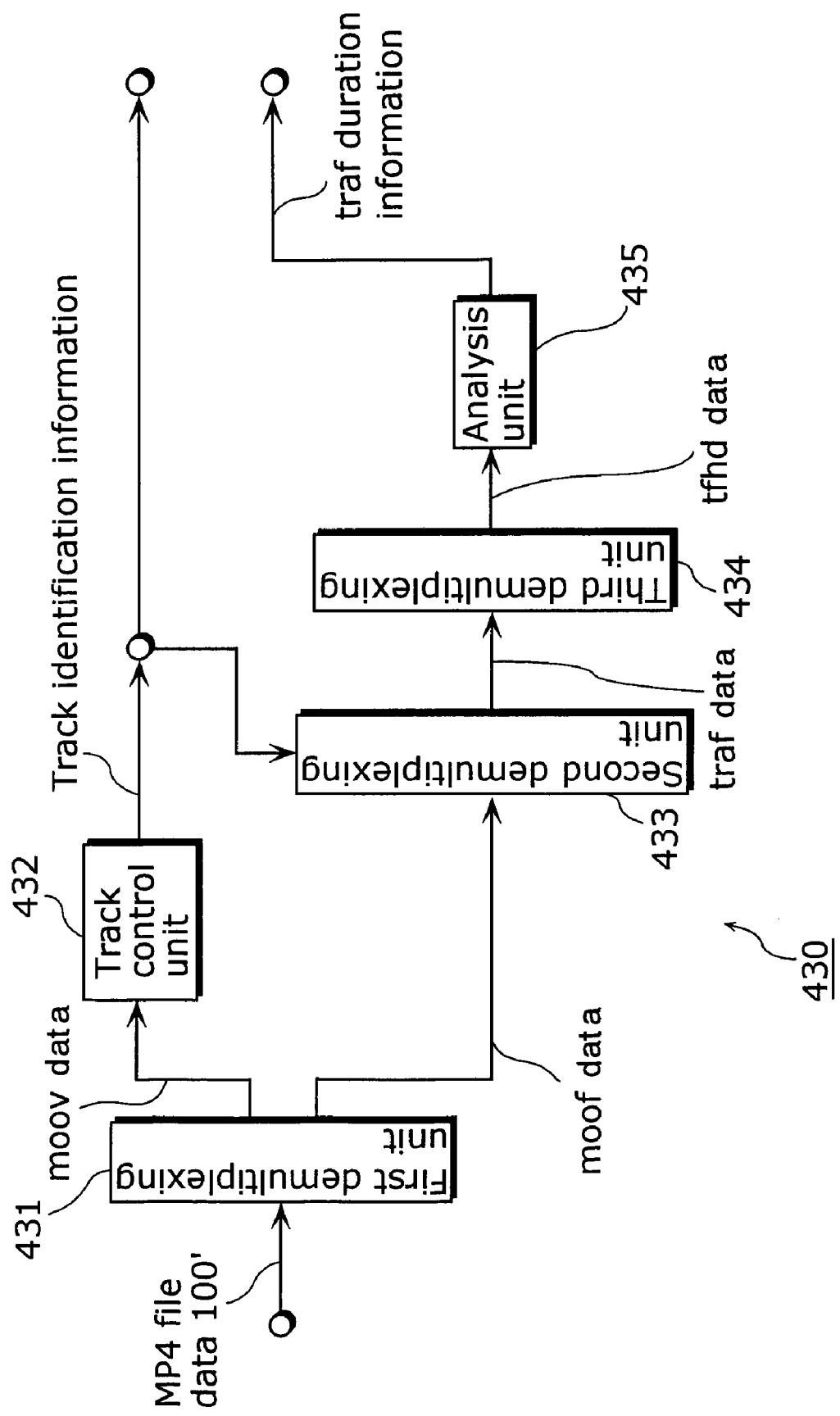
FIG. 28 is a block diagram showing the internal structure of the traf duration processing unit concerning the variation in accordance with an embodiment of the invention.

FIG. 28 is a block diagram showing the internal structure of the traf duration processing unit 430.

The traf duration processing unit 430 includes the first demultiplexing unit 431, the second demultiplexing unit 433, the third demultiplexing unit 434, a track control unit 432 and an analysis unit 435.

The first demultiplexing unit 431, upon obtaining the MP4 file data 100', demultiplexes the moov data and the moof data from the MP4 file data 100' and outputs them.

The track control unit 432, upon obtaining the moov data from the first demultiplexing unit 431, outputs the track identification information based on the moov data.

The second demultiplexing unit 433 obtains the moof data from the first demultiplexing unit 431 and the track identification information from the track control unit 432, analyzes the moof data, demultiplexes the traf data corresponding to the track specified in the track identification information from the moof data, and outputs the traf data.

The third demultiplexing unit 434, upon obtaining the traf data from the second demultiplexing unit 433, demultiplexes the tfhd data from the traf data and outputs the tfhd data.

An analysis unit 435, upon obtaining the tfhd data from the third demultiplexing unit 434, analyzes the tfhd data, extracts the traf duration information from the tfhd data and outputs the traf duration information.

Also, the sample duration processing unit 440 demultiplexes the trun data track by track by performing the predetermined demultiplexing on the MP4 file data 100', extracts the sample duration information from the trun data and outputs the sample duration information.

Figure 29:
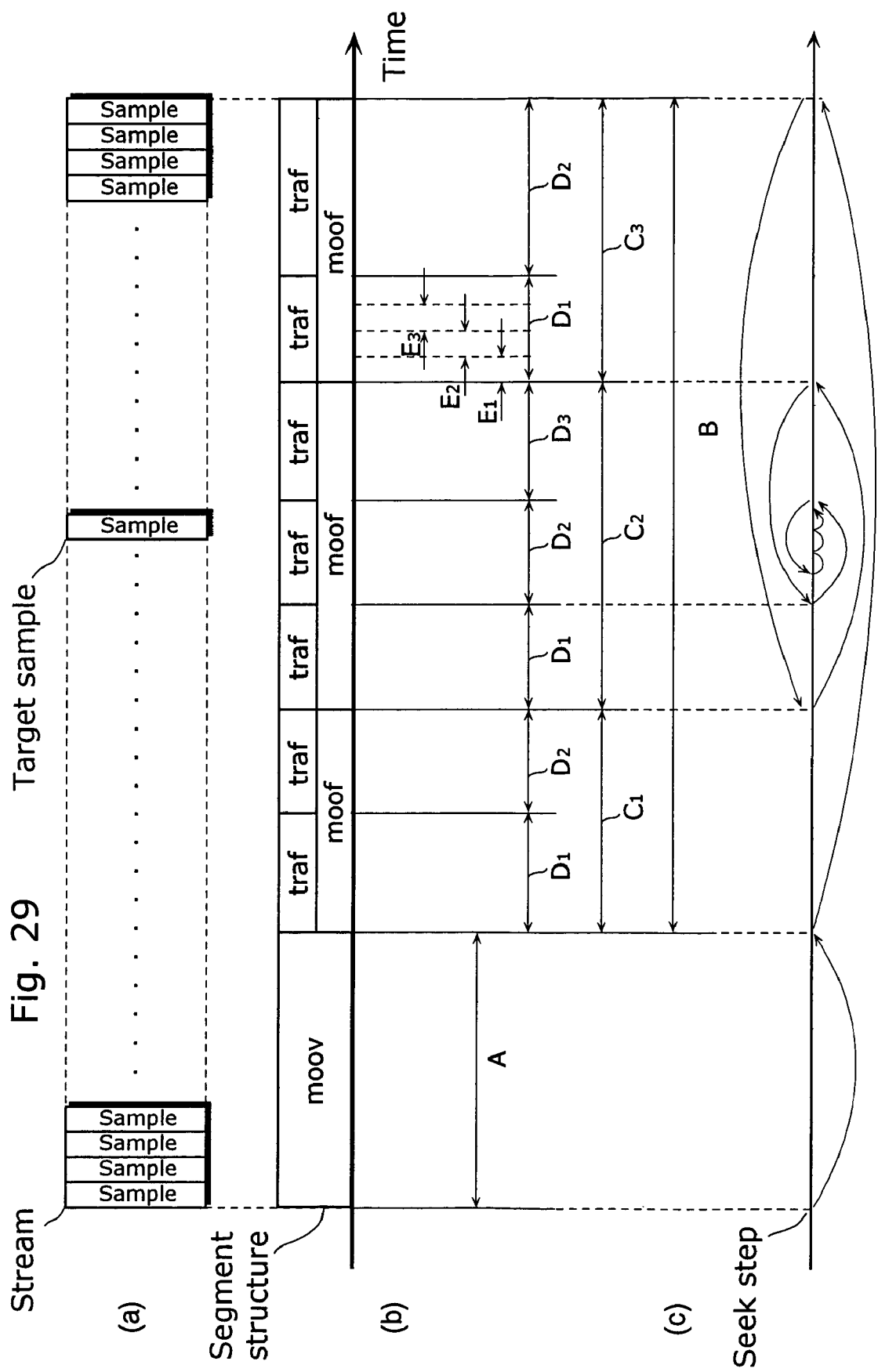
FIG. 29 is an illustration explaining the outline operation of the random access processing unit concerning the variation in accordance with an embodiment of the invention.

FIG. 29 is an illustration explaining the outline operation of the random access processing unit 400.

The (a) of FIG. 29 is a data block diagram indicating the stream of the MP4 file data 100'. The stream like this is formed for each sample, and each sample contains a flag indicating that the sample is seekable (readable first).

The (b) of FIG. 29 is a data block diagram showing the segment structure of the MP4 file data 100'.

The file format of the MP4 file data 100' contains the moov 110 and the moof 130' as mentioned above, the moof 130' contains a traf 132.

The total content duration contained in the MP4 file data 100' is shown as the addition result of the non-fragment content duration A and the fragmented content duration B.

Further, the fragmented content duration B is shown as the addition result of the moof duration $C_1$, $C_2$, and so on indicated by each moof 130' of the fragmented data part, and the moof durations $C_1$, $C_2$, and so on are shown as the addition result of the traf durations $D_1$, $D_2$, and so on indicated by each traf 132 of the respective moof 130'.

The (c) of FIG. 29 is an illustration explaining the seek operation of the random access processing unit 400.

The random access processing unit 400, when obtaining the target duration information indicating the target time, adds the fragmented content duration B to the non-fragment content duration A first. When the addition result becomes equal to the target time, the random access processing unit 400 specifies the lastly-obtained sample of the MP4 file data 100' as the target sample and outputs the target sample identification information indicating the target sample.

On the other hand, when the addition result exceeds the target time, the random access processing unit 400 adds the moof durations $C_1$, $C_2$, and so on to the non-fragment content duration A in a time order. When the addition result becomes equal to the target time, the random access processing unit 400 specifies the last sample corresponding to the lastly-added moof duration as the target sample and outputs the target sample identification information indicating the target sample.

Also, when the addition result exceeds the target time, the random access processing unit 400 adds the traf durations $D_1$, $D_2$, and so on in a time order to the addition result immediately before exceeding the target time. When the addition result becomes equal to the target time, the random access processing unit 400 specifies the last sample corresponding to the lastly-added traf duration as the target sample, and outputs the target sample identification information indicating the sample.

In addition, when the addition result exceeds the target time, the random access processing unit 400 adds the sample durations $E_1$, $E_2$ and so on in a time order to the addition result immediately before exceeding the target time. Here, when the addition result becomes equal to the target time, the random access processing unit specifies the sample corresponding to the lastly-added sample duration as the target sample, and outputs the target sample identification information indicating the target sample.

Figure 30:
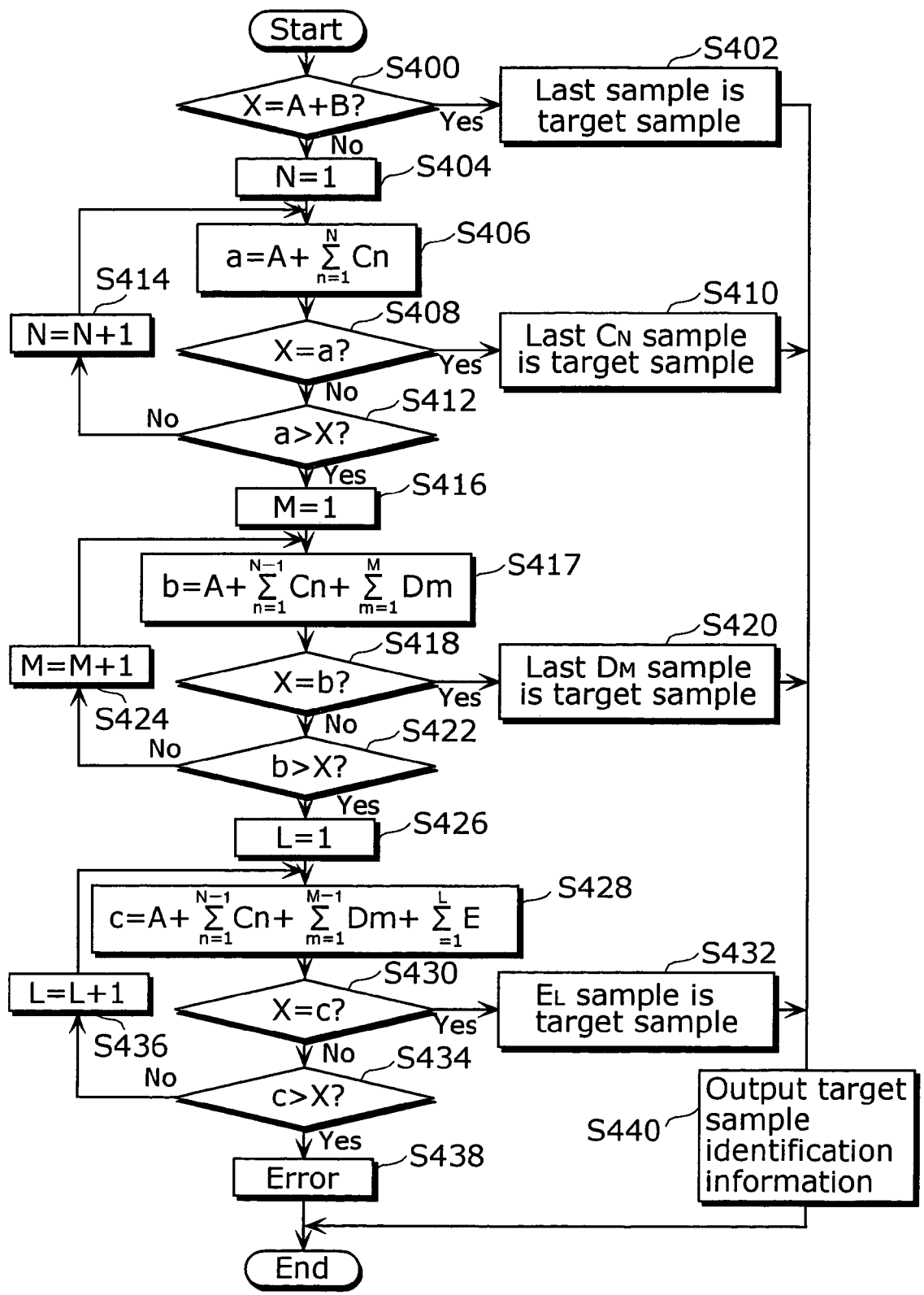
FIG. 30 is a flow chart showing the operation of the random access processing unit concerning the variation in accordance with an embodiment of the invention.

FIG. 30 is a flow chart showing the operation of the random access processing unit 400.

First, the random access processing unit 400 adds the fragmented content duration B to the non-fragment content duration A, and judges whether or not the addition result becomes equal to the target time X (step S400).

When the addition result is judged to be equal as a result (step S400: Yes), the random access processing unit 400 judges that the target sample is the last sample of the MP4 file data (step S402).

On the other hand, when the addition result is judged to be unequal (step S400: No), the random access processing unit 400 regards the variable N as 1 (step S404) and calculates the duration a using the non-fragment content duration A and the moof duration $C_n$ based on the following formula (step S406).

$$a = A + \sum_{n=1}^{N} C_n$$

Here, the random access processing unit 400 judges whether or not the duration a is equal to the target time X (step S408), and further judges that the target sample is the last sample corresponding to the moof duration $C_n$ (step S410) when judging that it is equal (step S408: Yes).

Also, the random access processing unit 400, when judging that the duration a is not equal to the target time X (step S408: No), further judges whether or not the duration a is bigger than the target time X (step S412).

The random access processing unit 400, when judging that the duration a is not bigger than the target time X (step S412: No), regards N as N+1 (step S414), further repeatedly exerts the operation from the step S406. The above-mentioned formula shows the addition result of the non-fragment content duration A and the moof durations $C_1$~$C_n$, but the random access processing unit 400 solves the above-mentioned formula by temporally storing the addition result and further adding the $C_n$ corresponding to the N to the saved result of the addition processing mentioned above each time N is incremented by 1 instead of exerting addition processing of the above-mentioned formula each time N is incremented.

When the duration a is judged to be bigger than the target time X (step S412: Yes), the random access processing unit 400 regards variable M as 1 (step S416) first, and calculates the duration b using the non-fragment content duration A, the moof duration $C_n$, and the traf duration $D_m$ based on the following formula (step S417).

$$b = A + \sum_{n=1}^{N-1} C_n + \sum_{m=1}^{M} D_m$$

Here, the random access processing unit 400 judges whether or not the duration b is equal to the target time X (step S418), when judging that it is equal (step S418: Yes), the target sample is judged to be the last sample corresponding to the traf duration $D_m$ (step S420).

Also, the random access processing unit 400, when the duration b is judged to be unequal to the target time X (step S418: No), further judges whether or not the duration b is bigger than the target time X (step S422).

The random access processing unit 400, when judging the duration b is smaller than the target time X (step S422: lNo), regards M as M+1 (step S424), further repeatedly exerts the operation from the step S417. And, when judging the duration b is bigger than the target time X (step S422: Yes), the random access processing unit 400 regards variable L as 1 (step S426) first, and then calculate the duration c using the non-fragment content duration A, the moof duration $C_n$, the traf duration $D_m$ and the sample time $E_l$ based on the following formula (step S428).

$$c = A + \sum_{n=1}^{N-1} C_n + \sum_{m=1}^{M-1} D_m + \sum_{l=1}^{L} E_l$$

Here, the random access processing unit 400 judges whether or not the duration c is equal to the target time X (step S430), and judges that the target sample is the sample corresponding to the sample duration $E_l$ (step S432) when judging that duration c is equal to the target time X (step S430: Yes).

Also, the random access processing unit 400, when judging that the duration c is unequal to the target time X (step S430: No), further judges whether or not the duration c is bigger than the target time X (step S434).

The random access processing unit 400, when judging that the duration c is smaller than the target time X (step S434: No), regards L as L+1 (step S436), further repeatedly exerts the operation from the step S428. And, when judging the duration c is bigger than the target time X (step S434: Yes), the random access processing unit 400 judges that an error occurs (step S438).

After specifying a target sample in the step S402, the step S410, the step S420 or the step S432, the random access processing unit 400 outputs the target sample identification information indicating the target sample (step S440).

Figure 1:
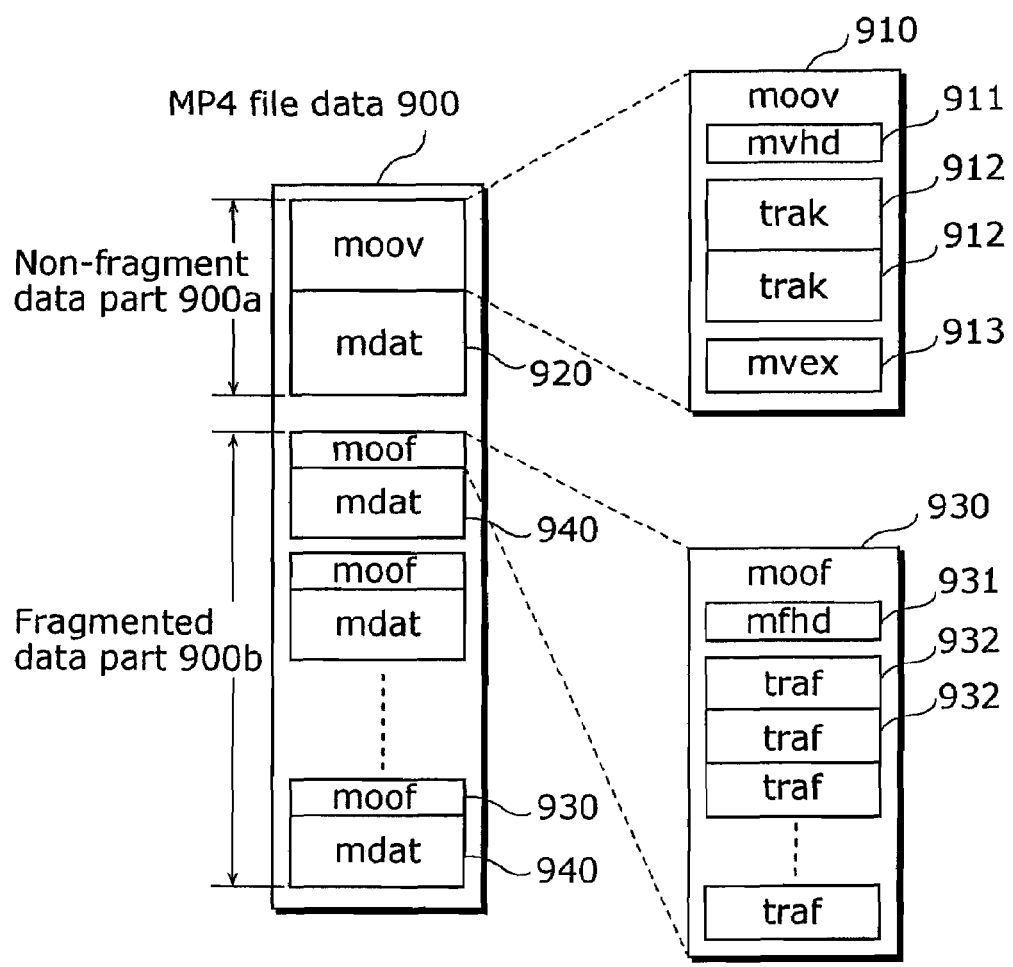
FIG. 1 is a data block diagram showing the basic file format of the MP4 file data in the conventional example.
Figure 2:
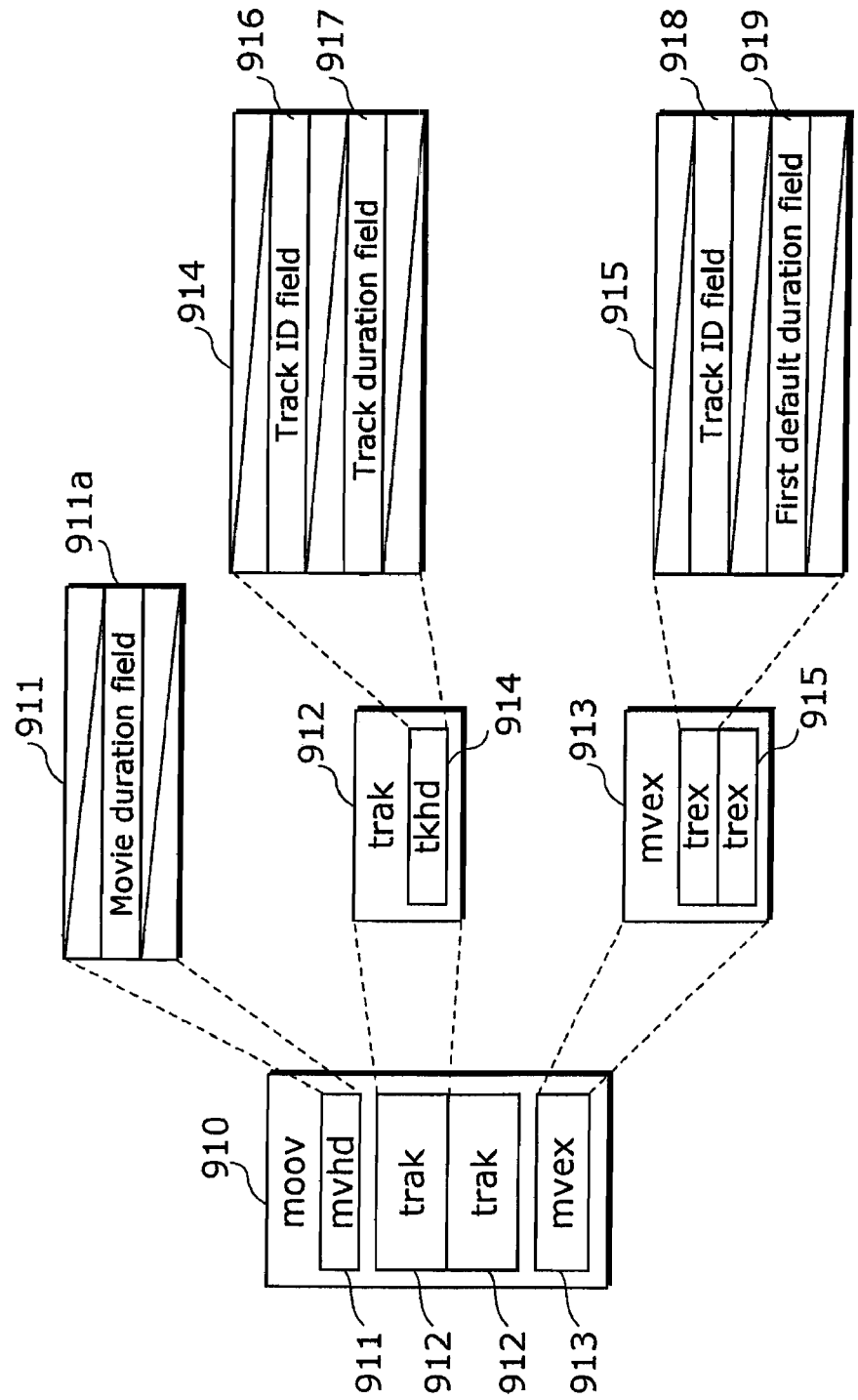
FIG. 2 is a data block diagram showing the detailed structure of the moov in the MP4 file data in the conventional example.
Figure 3:
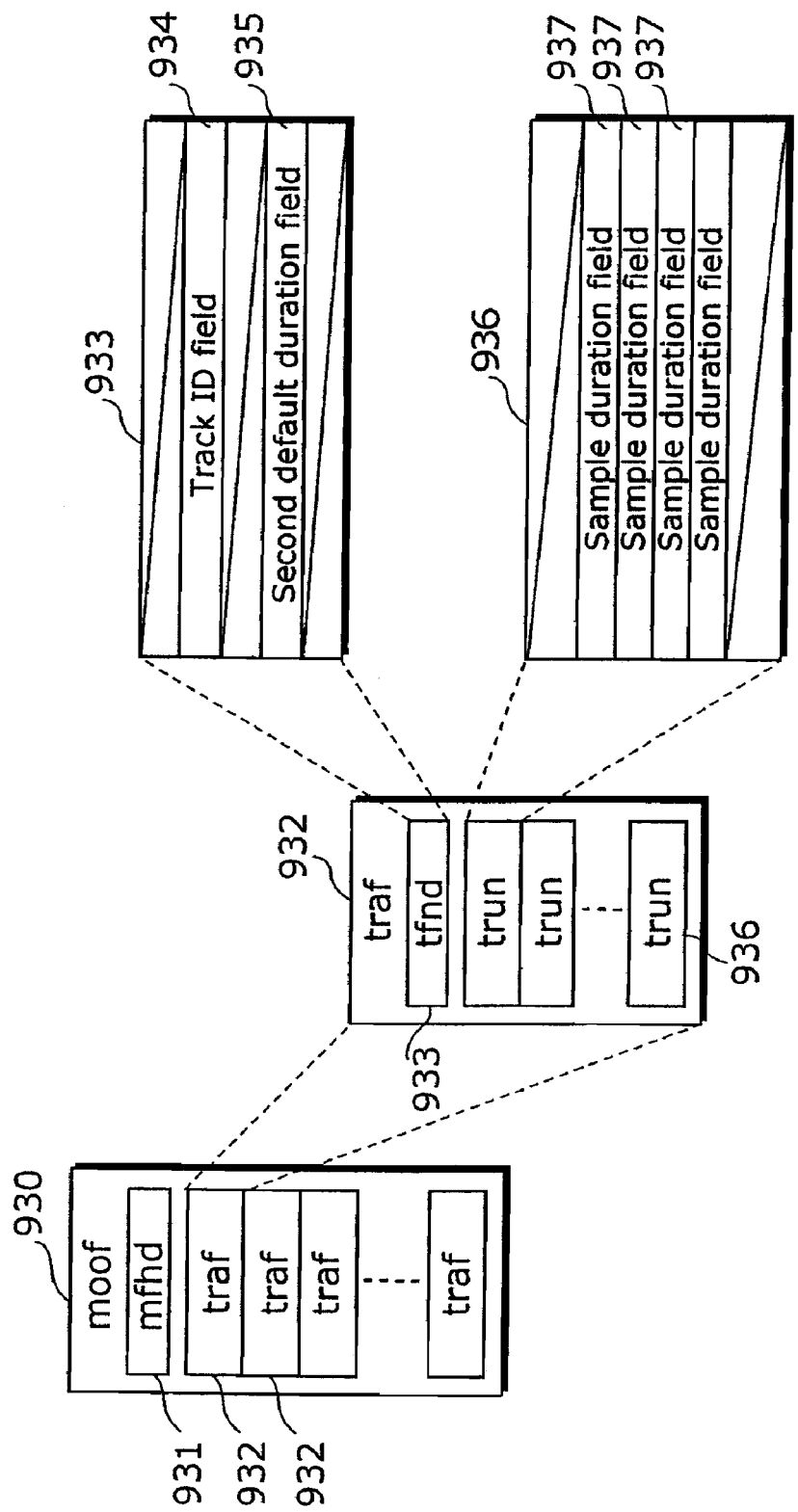
FIG. 3 is a data block diagram showing the detailed structure of the moof in the MP4 file data in the conventional example.
Figure 4:
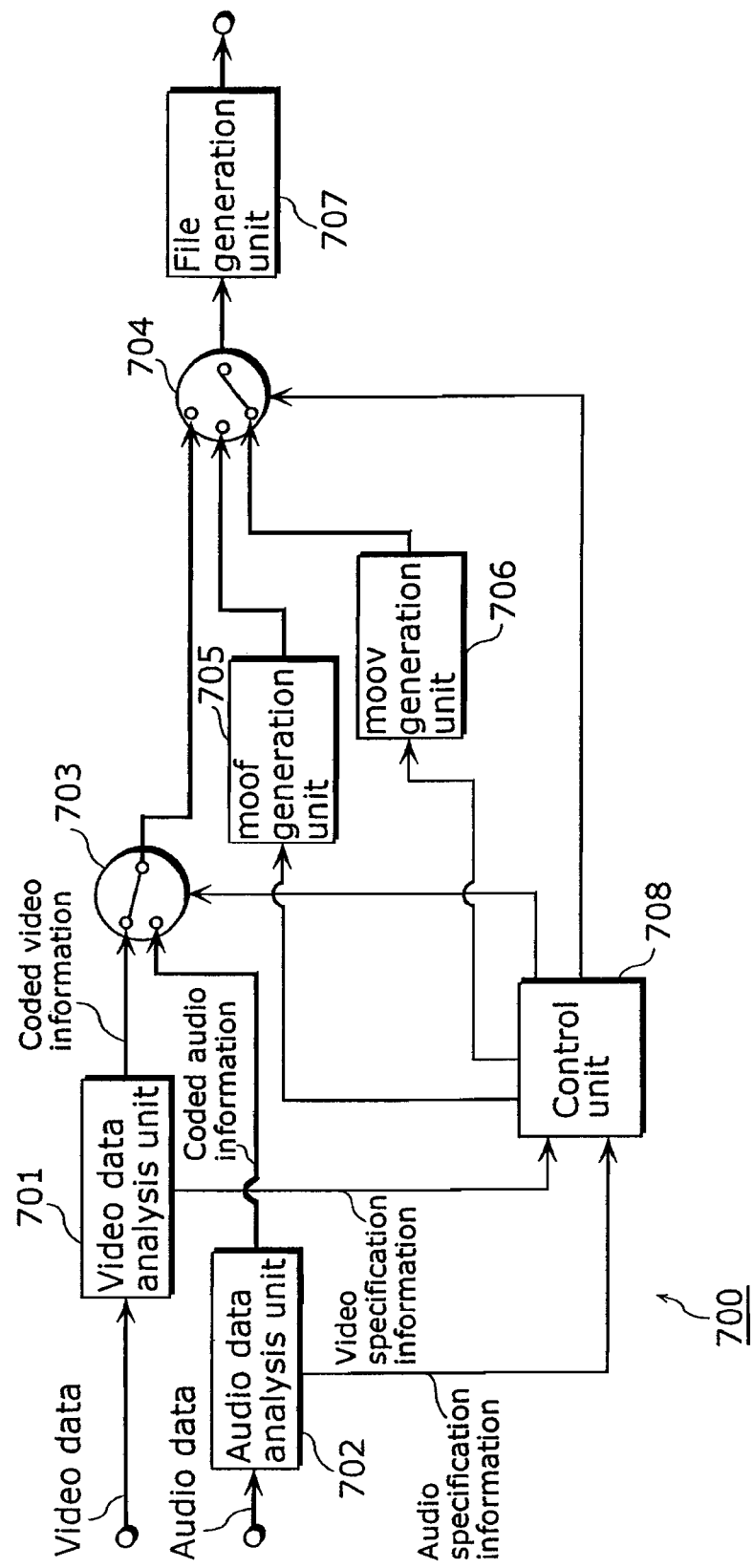
FIG. 4 is a block diagram showing the structure of the conventional multiplexing apparatus for generating the MP4 file data in the conventional example.
Figure 5:
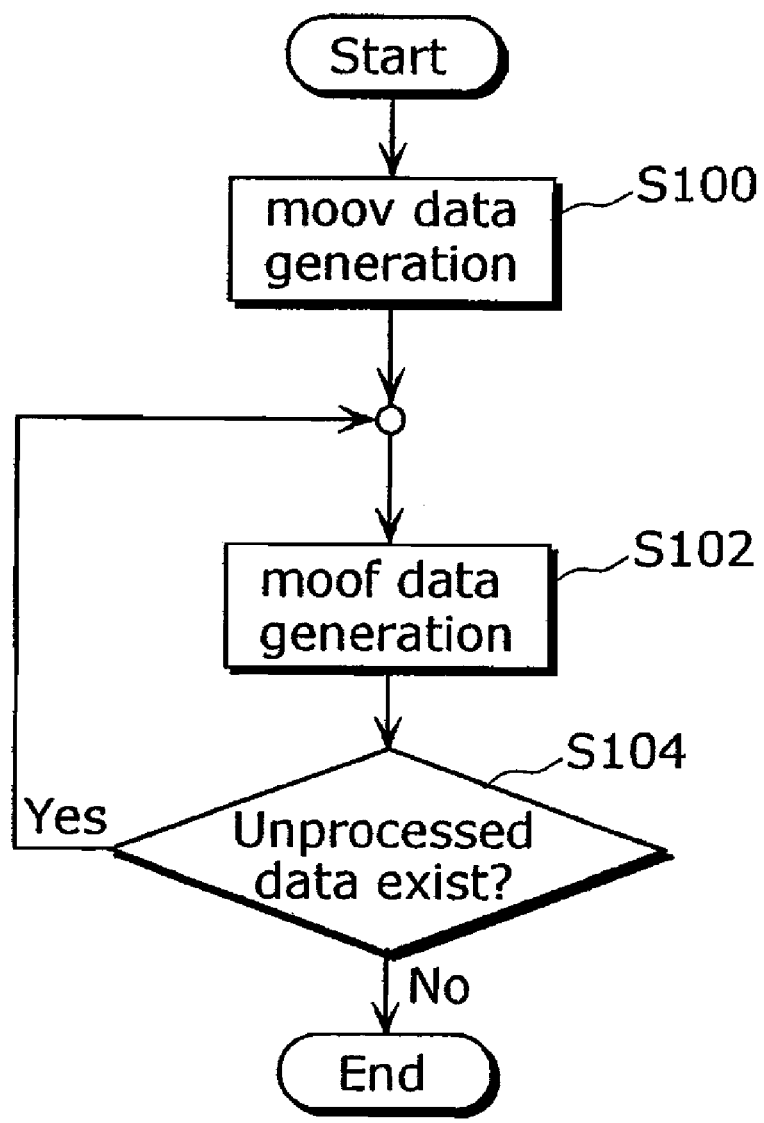
FIG. 5 is a flow chart showing the operation concerning the generation of the moov data and the moof data of the multiplexing apparatus in the conventional example.
Figure 6:
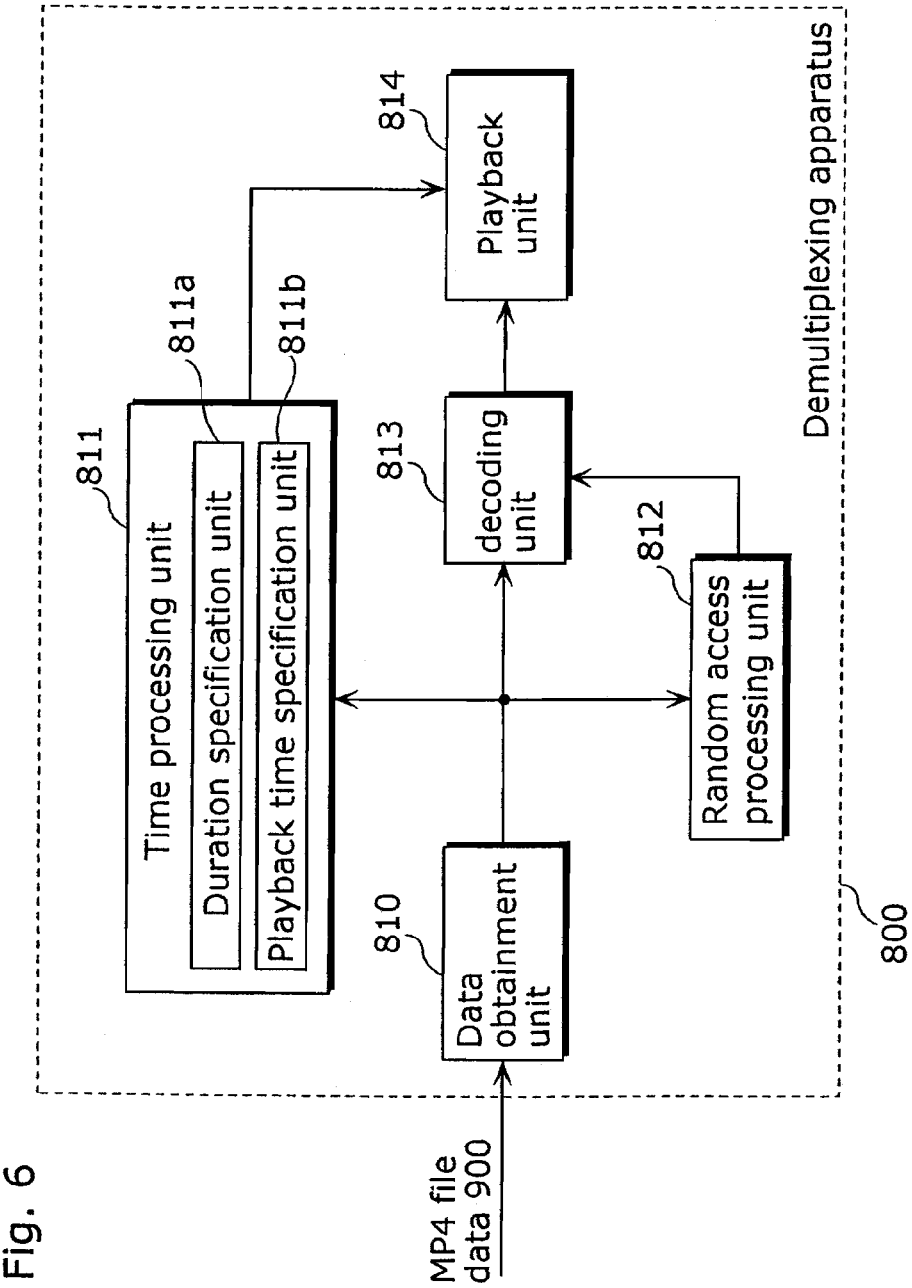
FIG. 6 is a block diagram showing the structure of the conventional demultiplexing apparatus for performing playback based on the MP4 file data in the conventional example.
Figure 7:
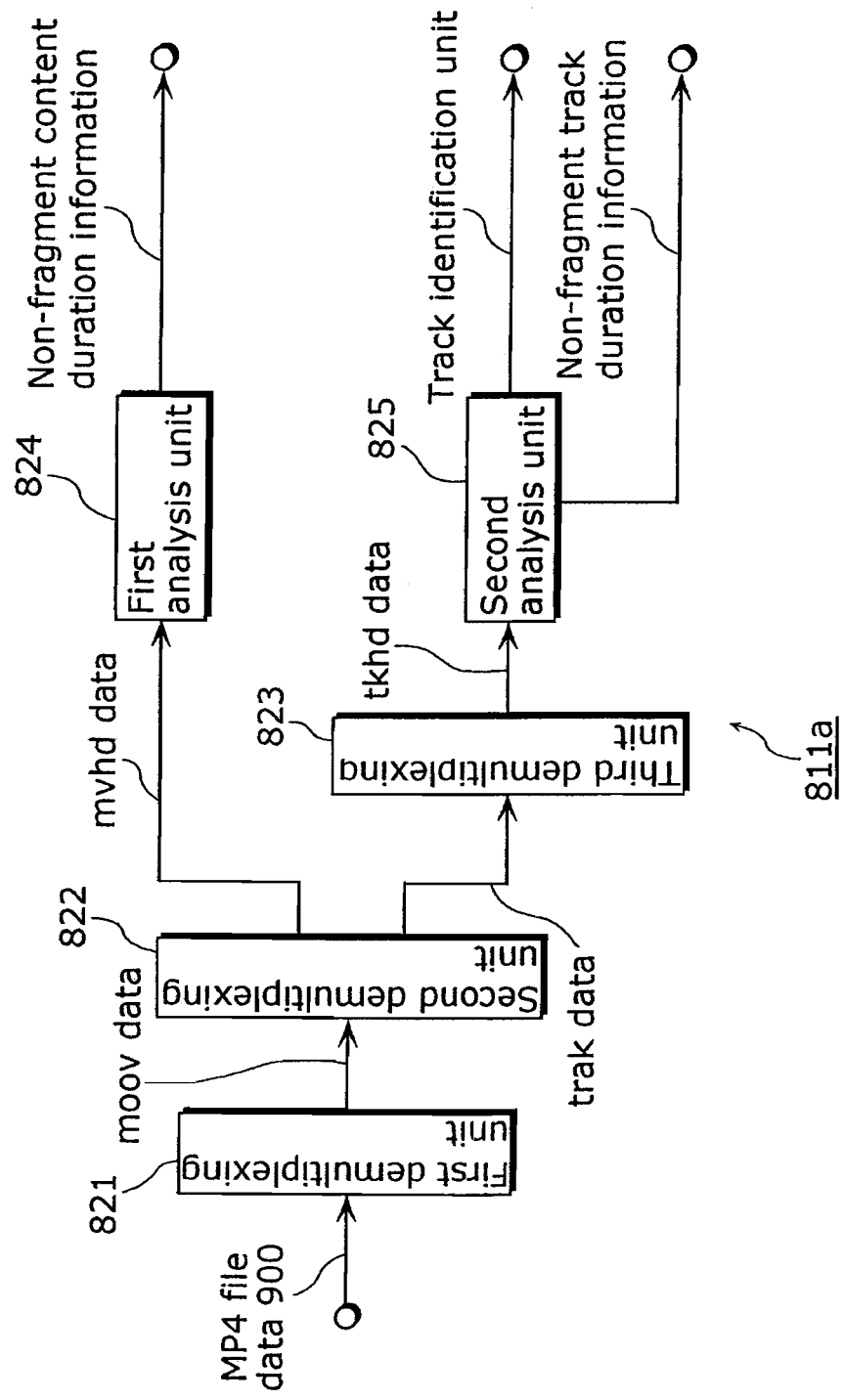
FIG. 7 is a block diagram showing the internal structure of the duration specification unit in the conventional example.
Figure 8:
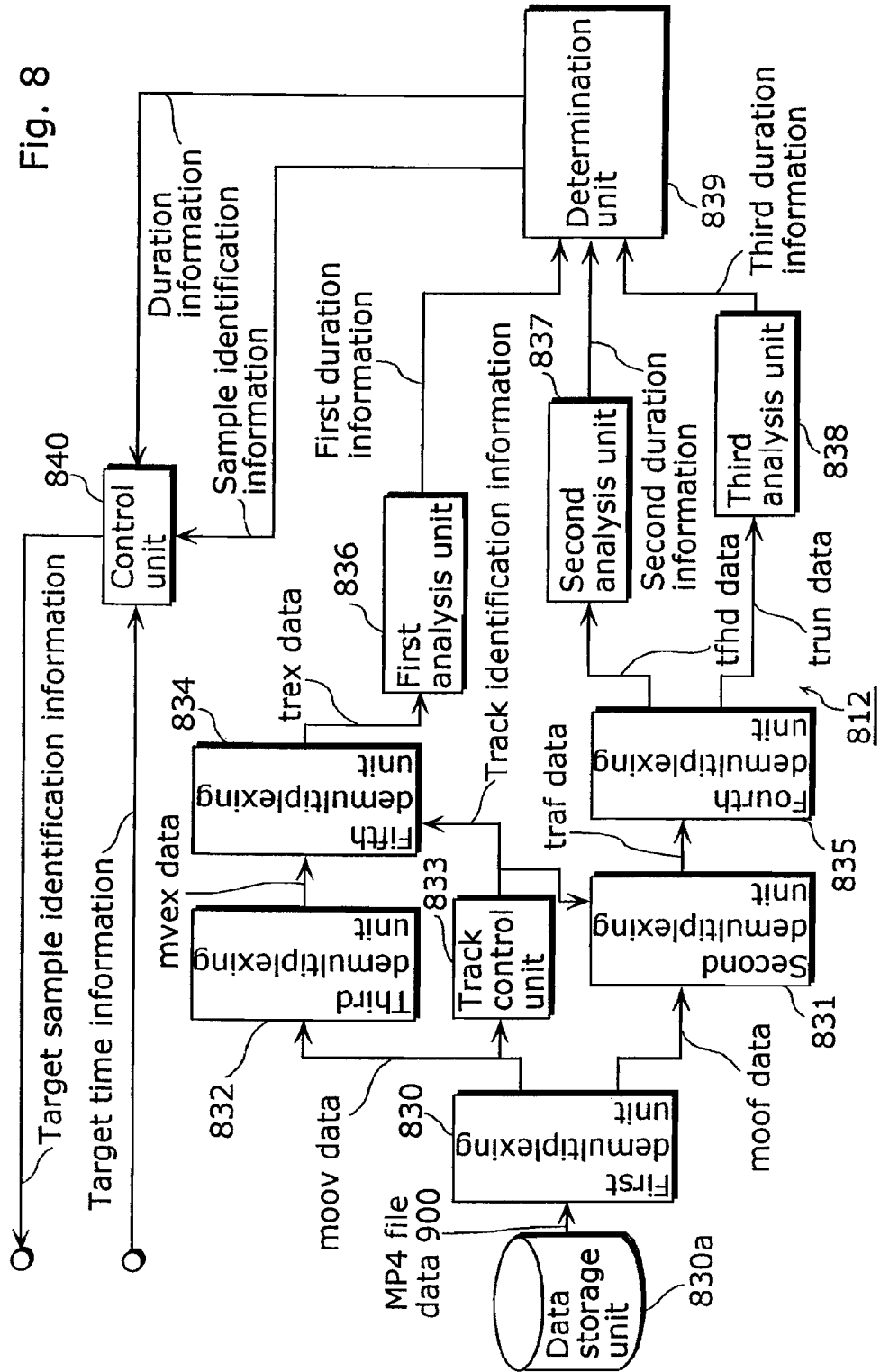
FIG. 8 is a block diagram showing the structure of the random access processing unit in the conventional example.
Figure 9:
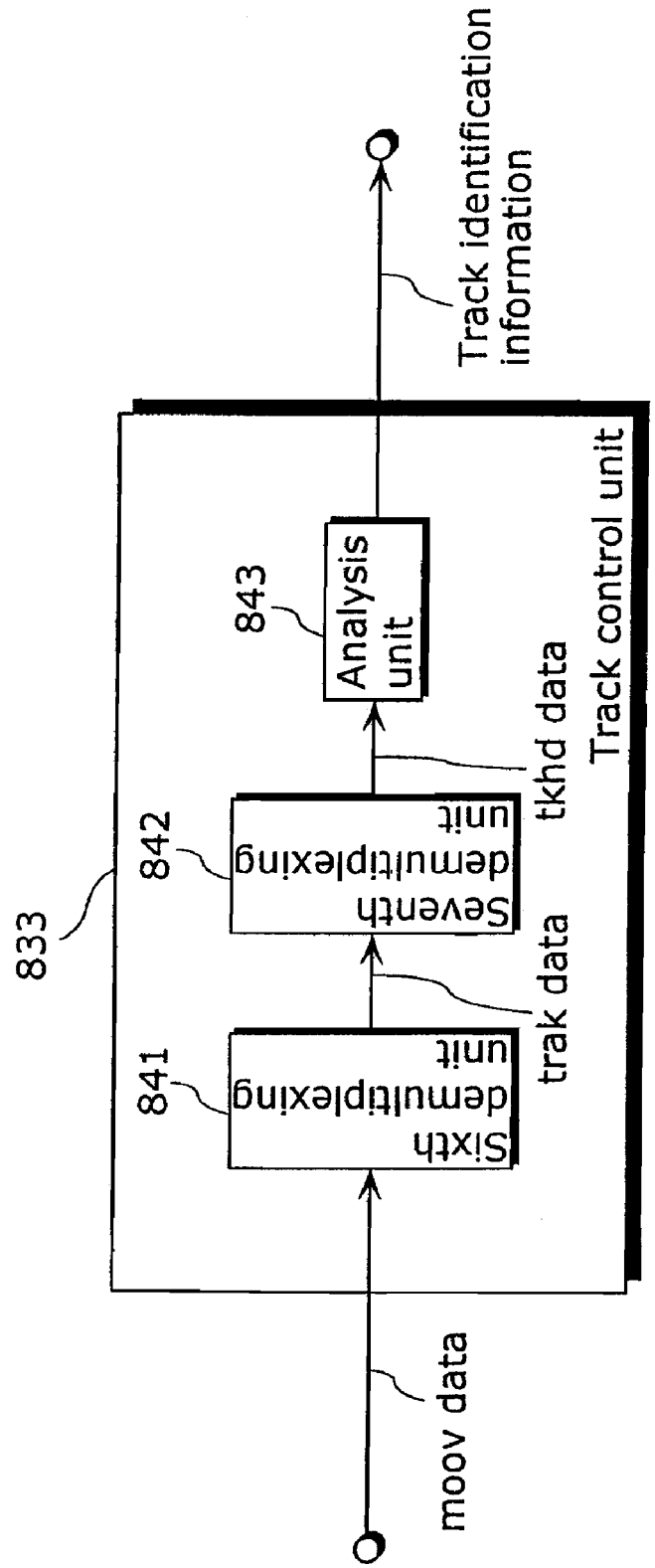
FIG. 9 is a block diagram showing the internal structure of the track control unit in the conventional example.
Figure 10:
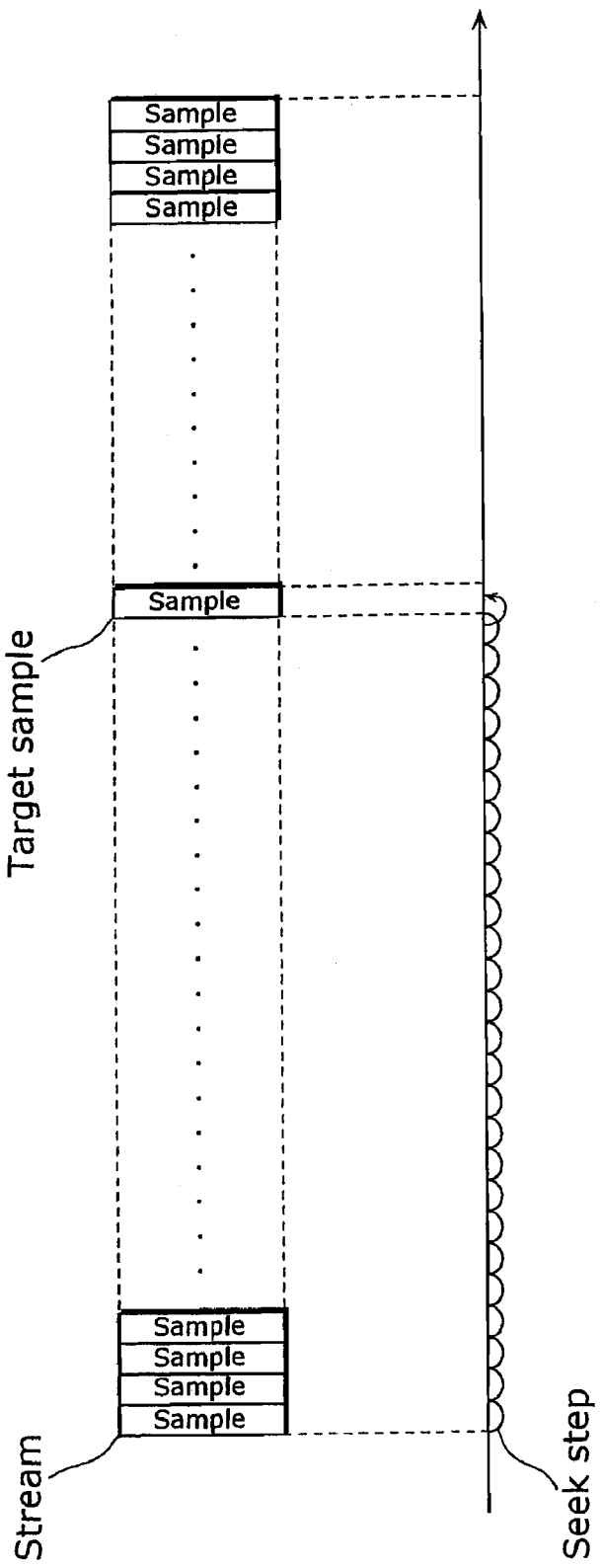
FIG. 10 is an illustration explaining the outline operation of the random access processing unit in the conventional example.
Figure 11:
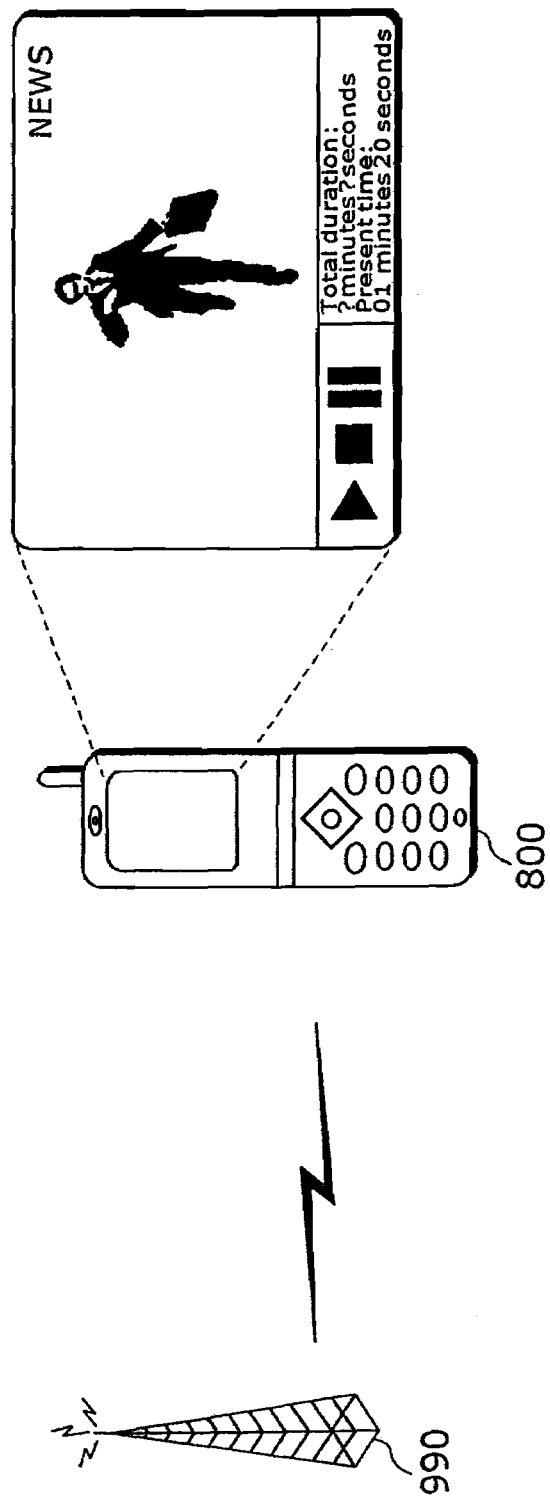
FIG. 11 is an illustration explaining a problem in the conventional demultiplexing apparatus in the conventional example.

In this way, this variation makes it possible to reduce the calculation amount compared to the operation of the conventional random access processing unit 812 shown in FIG. 8 and quickly search a target sample because of the following reason: First, the moof duration field 131d that stores the moof duration information is established in the mfhd 131 of the moof 130' in the fragmented data part and the traf duration field 135 that stores the traf duration information is established in the tfhd 133; second, the fragmented content duration is used when searching the target sample using the target time when performing a random access; third, the moof duration shorter than the fragmented content duration is used; fourth, the traf duration shorter than the moof duration is used; and lastly, a sample duration shorter than the traf duration is used.

After that, the random access processing unit 400 outputs the MP4 file data 100' and the target sample identification information to the decoding unit 213, and has the decoding unit 213 and the playback unit 214 exert playing back the content from the target sample indicated in the target sample identification information.

FIG. 31 is a display diagram showing the syntax of the tfhd 133.

As shown in FIG. 31, for example, 32 bit is assigned to the traf duration field 135 of the traf 132.

The main control unit 410 of the random access processing unit 400 judges the output condition of the moof duration information from the moof duration processing unit 420 and the effectiveness of the moof duration indicated in the moof duration information, and it may use the addition result of all the traf durations instead of the moof duration by making the traf duration processing unit 430 output all pieces of the traf duration information stored in the moof 130' when using the moof duration, when the moof duration information is not outputted, or when the moof duration is judged to be uneffective. In addition, the main control unit 410 of the random access processing unit 400 judges the output condition of the traf duration information from the traf duration processing unit 430 and the effectiveness of the traf duration indicated in the traf duration information, and it may use the addition result of all the sample durations instead of the traf duration by making the sample duration processing unit 440 output all pieces of the sample duration information stored in the traf 132 when using the traf duration, when the traf duration information is not outputted, or when the traf duration is judged to be uneffective.

Also, flags indicating whether or not respective samples are seekable are contained in the above-mentioned variation, a single flag for plural samples corresponding to the moof 130 or a single flag for plural samples corresponding to the traf 132 can also be contained. In this way, the checking process of the flags for respective samples can be omitted.

The demultiplexing apparatus concerning the present invention is suitable for a personal computer or a cellular phone that downloads and plays back the MP4 file data, and the multiplexing apparatus concerning the present invention is suitable for a digital video camera or a cellular phone with a videotaping function that obtains multi media data such as video or audio, makes and videotapes the MP4 file data.

The invention claimed is:

1. A demultiplexing apparatus for obtaining and demultiplexing multiplexed data where contents of a digital copyrighted work are multiplexed starting from a header,
   wherein the multiplexed data includes plural pairs of content storage blocks for storing multiplexed contents and related information relating to the multiplexed contents, the plural pairs of content storage blocks being arranged serially and total duration information for specifying a total duration needed for playback of all of the contents is contained in the header, and the multiplexed data includes a first part or a first part and a second part including one or more of the plural pairs of the content storage blocks depending on the contents,
   the total duration information indicates a duration needed for playback of contents contained in the first part in the case where the multiplexed data includes the first part, and
   the total duration information includes a first duration information that indicates a duration needed for playback of the contents contained in the first part, and second duration information that indicates a duration needed for playback of the contents contained in the second part or indicates that a duration is unknown in the case where the multiplexed data includes the first part and the second part, the demultiplexing apparatus comprises:

an obtainment unit operable to obtain the multiplexed data;

a demultiplexing processing unit operable to demultiplex the multiplexed data obtained by said obtainment unit for each of the plural pairs of content storage blocks;

a total duration specification unit operable to specify the total duration based on the total duration information contained in a header of the multiplexed data obtained by said obtainment unit; and a display unit operable to display the total duration specified by said total duration specification unit, wherein said total duration specification unit is operable to judge whether the multiplexed data obtained by said data obtainment unit includes the first part, or the first part and the second part, said total duration specification unit is operable to specify the total duration indicated by the total duration information as the total duration in the case where it judges that the multiplexed data includes the first part, said total duration specification unit is further operable to judge whether the duration needed for playback of the contents contained in the second part is unknown or not based on the second duration information in the case where it judges that the multiplexed data includes the first part and the second part, said total duration specification unit is operable to specify the total duration by adding the duration indicated by the second duration information to the duration indicated by the first duration information in the case where it judges that the duration is not unknown, said total duration specification unit is operable to judge that it cannot specify the total duration in the case where it judges that duration is unknown, and said display unit is operable to notify that the total duration is unknown in the case where said total duration specification unit judges that it cannot specify the total duration.

2. The demultiplexing apparatus according to claim 1, wherein the header of the multiplexed data is configured to contain part specification information indicating whether the multiplexed data includes the first part and the second part or not, and said total duration specification unit is operable to judge whether the multiplexed data obtained by said obtainment unit includes the first part, or the first part and the second part based on the part specification information.

3. A multiplexing apparatus for multiplexing contents of a digital copyrighted work and generating multiplexed data, comprising:

an obtainment unit operable to obtain the contents;

a multiplexing unit operable to multiplex the contents;

a duration information generation unit operable to generate total duration information for specifying a total duration needed for playback of the contents based on the contents obtained by said obtainment unit;

a data generation unit operable to generate the multiplexed data that includes plural pairs of content storage blocks for storing contents multiplexed by said multiplexing unit and related information relating to the contents, the plural pairs of content storage blocks being arranged serially and the total duration information generated by said duration information generation unit is contained in a header, wherein said data generation unit is operable to generate the multiplexed data from a first part, or a first part and a second part including one or more of the plural pairs of content storage blocks according to the contents contained in the multiplexed data, said duration information generation unit is operable to generate the total duration information that indicates a duration needed for playback of contents contained in the first part where the multiplexed data includes the first part, and said duration information generation unit is operable to generate the total duration information from first duration information that indicates a duration needed for playback of contents contained in the first part, and second duration information that indicates a duration needed for playback of contents contained in the second part or indicates that a duration is unknown in the case where the multiplexed data includes the first part and the second part.

4. The multiplexing apparatus according to claim 3, wherein said data generation unit is operable to generate the multiplexed data including part specification information indicating whether or not the multiplexed data is made from the first part and the second part in the header of the multiplexed data.

* * * * *

UNITED STATES PATENT AND TRADEMARK OFFICE
CERTIFICATE OF CORRECTION

| | | |
|---|---|---|
| PATENT NO. | : 7,436,859 B2 | Page 1 of 1 |
| APPLICATION NO. | : 10/504295 | |
| DATED | : October 14, 2008 | |
| INVENTOR(S) | : Youji Notoya et al. | |

It is certified that error appears in the above-identified patent and that said Letters Patent is hereby corrected as shown below:

On the Title Page
After (65) Priority Publication Data, please add

-- (60) Related U.S. Application Data
US Provisional Application No. 60/378,644 filed on
May 9, 2002 --

Signed and Sealed this

Seventh Day of April, 2009

JOHN DOLL
*Acting Director of the United States Patent and Trademark Office*